United States Patent
Tanaka et al.

(10) Patent No.: US 7,912,479 B2
(45) Date of Patent: Mar. 22, 2011

(54) RADIO-CHANNEL CONNECTION CONTROLLER AND MOBILE COMMUNICATION NETWORK SYSTEM

(75) Inventors: Saburo Tanaka, Kawasaki (JP); Hisao Kawano, Kawasaki (JP); Hideki Hieida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 11/020,357

(22) Filed: Dec. 27, 2004

(65) Prior Publication Data

US 2006/0073837 A1 Apr. 6, 2006

(30) Foreign Application Priority Data

Sep. 17, 2004 (JP) .................................. 2004-272164

(51) Int. Cl.
*H04W 72/00* (2009.01)
(52) U.S. Cl. ....... 455/453; 455/450; 455/509; 455/63.4; 455/561; 455/562.1; 455/11.1; 455/436; 455/437; 455/438; 455/439; 455/440; 455/441; 455/442; 455/443; 455/444
(58) Field of Classification Search ................. 455/453, 455/450, 509, 63.4, 561, 562.1, 11.1, 436, 455/437, 438, 439, 440, 441, 442, 443, 444
See application file for complete search history.

(56) References Cited

U.S. PATENT DOCUMENTS

| | | | | |
|---|---|---|---|---|
| 5,327,575 A * | 7/1994 | Menich et al. | ................ | 455/437 |
| 5,504,937 A * | 4/1996 | Kangas | ......................... | 455/453 |
| 5,805,996 A * | 9/1998 | Salmela | ........................ | 455/453 |
| 6,282,425 B1 * | 8/2001 | Hottinen | ........................ | 455/453 |
| 2004/0219950 A1 * | 11/2004 | Pallonen et al. | ........... | 455/562.1 |

FOREIGN PATENT DOCUMENTS

| | | |
|---|---|---|
| JP | 04-177929 | 6/1992 |
| JP | 06-505842 | 6/1994 |
| JP | 08-205227 | 8/1996 |
| JP | 11-225105 | 8/1999 |
| JP | 2000-333257 | 11/2000 |
| JP | 2001-505023 | 4/2001 |

OTHER PUBLICATIONS

Office Communication dated Jun. 14, 2006 from corresponding European Patent Application No. 04 257 760.1.
Japanese Office Action dated Mar. 9, 2010 of corresponding Japanese Patent Application No. 2004-272164.

* cited by examiner

*Primary Examiner* — Patrick N Edouard
*Assistant Examiner* — Shantell Heiber
(74) *Attorney, Agent, or Firm* — Murphy & King, PC

(57) ABSTRACT

The network system of the present invention comprises a plurality of base transceiver stations, a plurality of antenna systems, and a radio-channel connection controller. The radio-channel connection controller comprises a connection switching unit switching the connection between the plurality of base transceiver stations and the plurality of antenna systems, and a switching control unit controlling the connection switching of the connection switching unit according to a loaded state of the network.

17 Claims, 27 Drawing Sheets

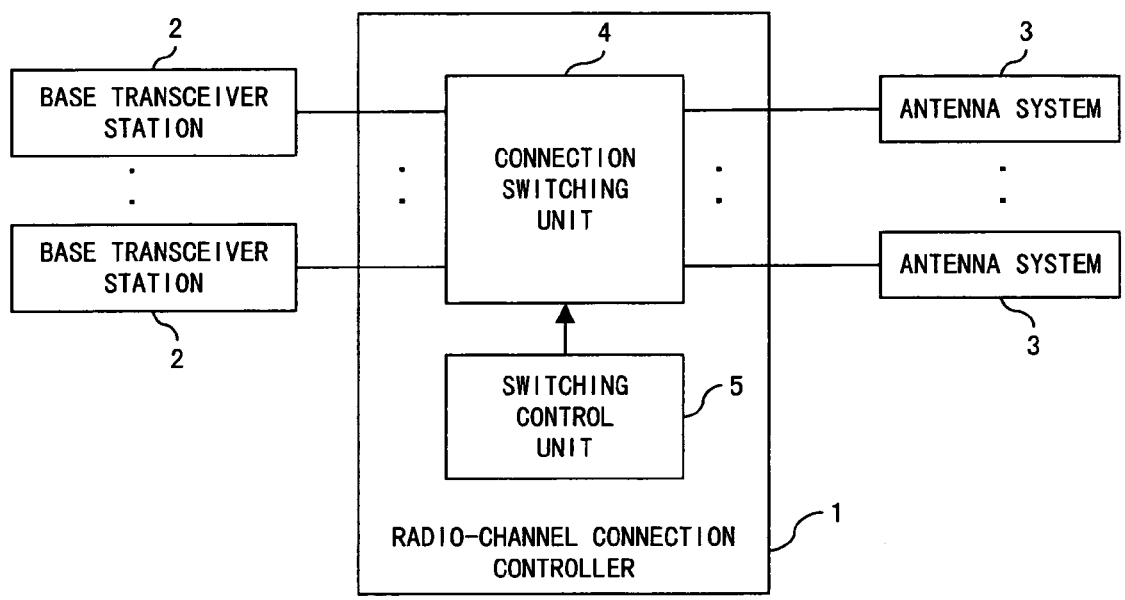
F I G. 1

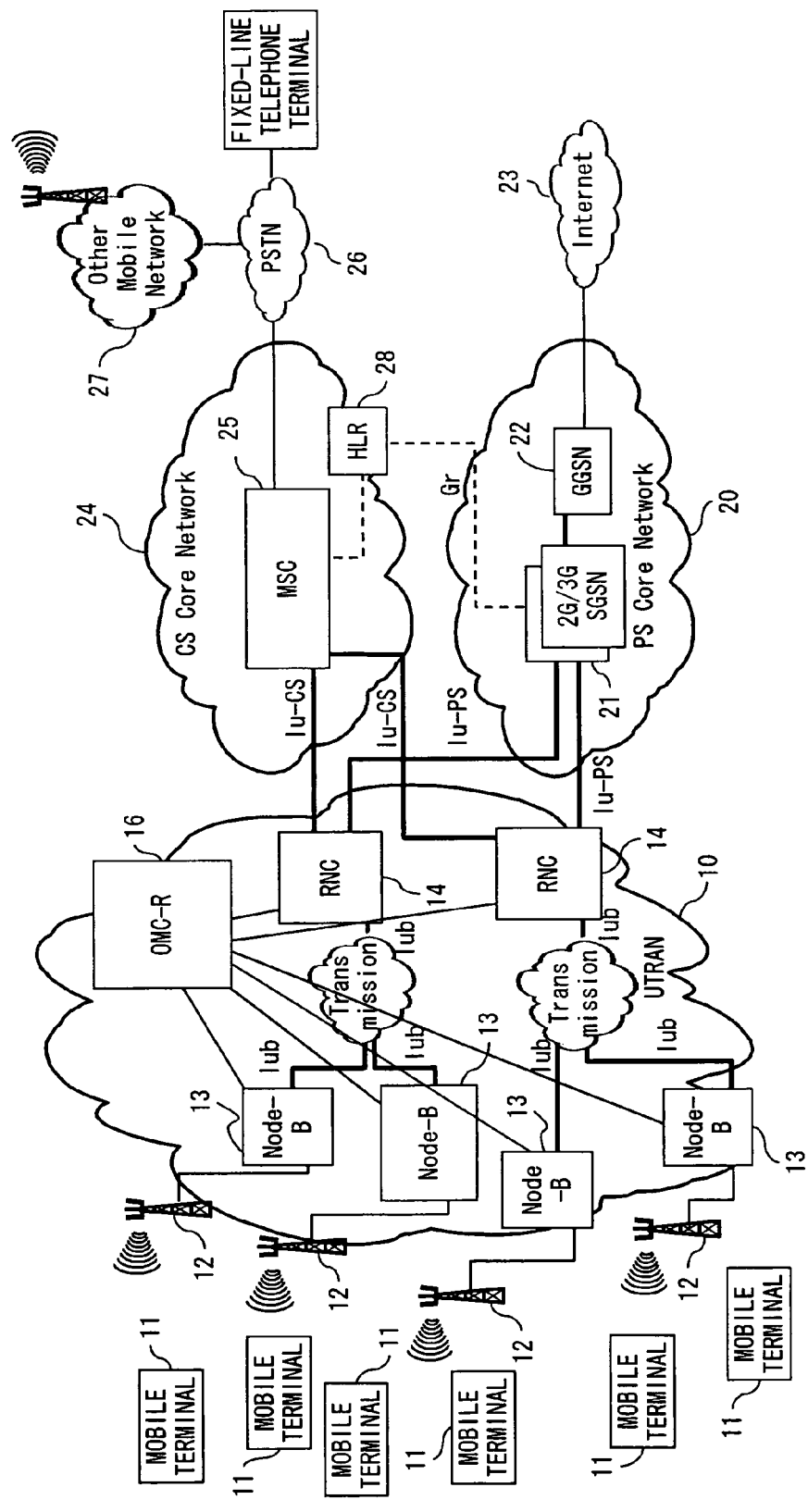
F I G. 2

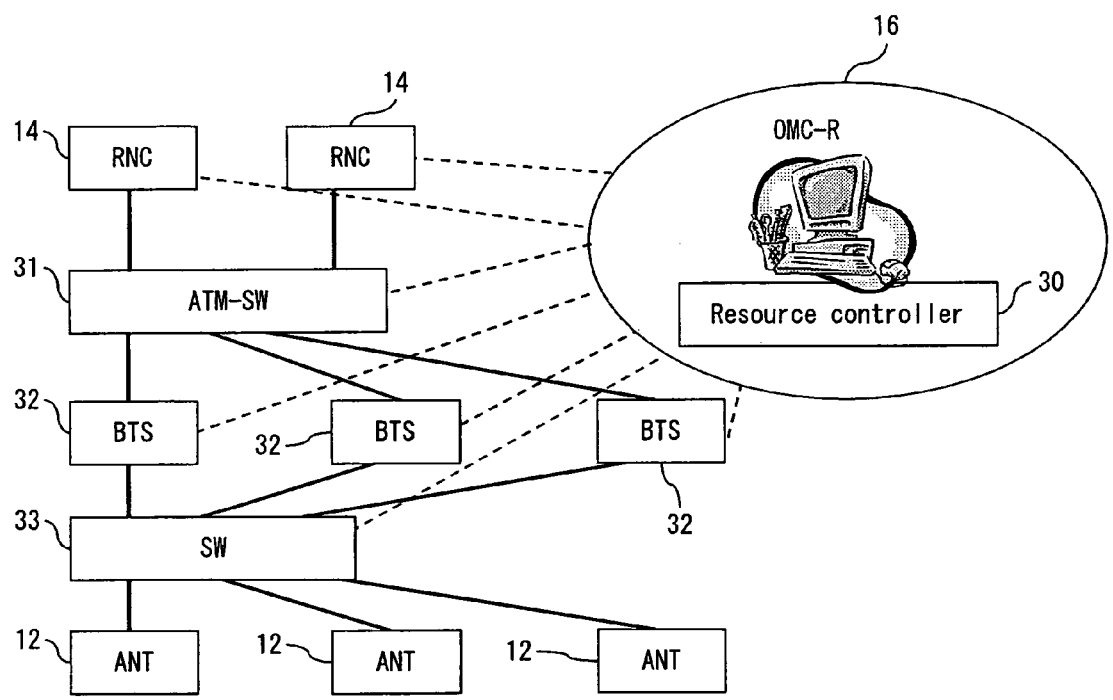
F I G. 4

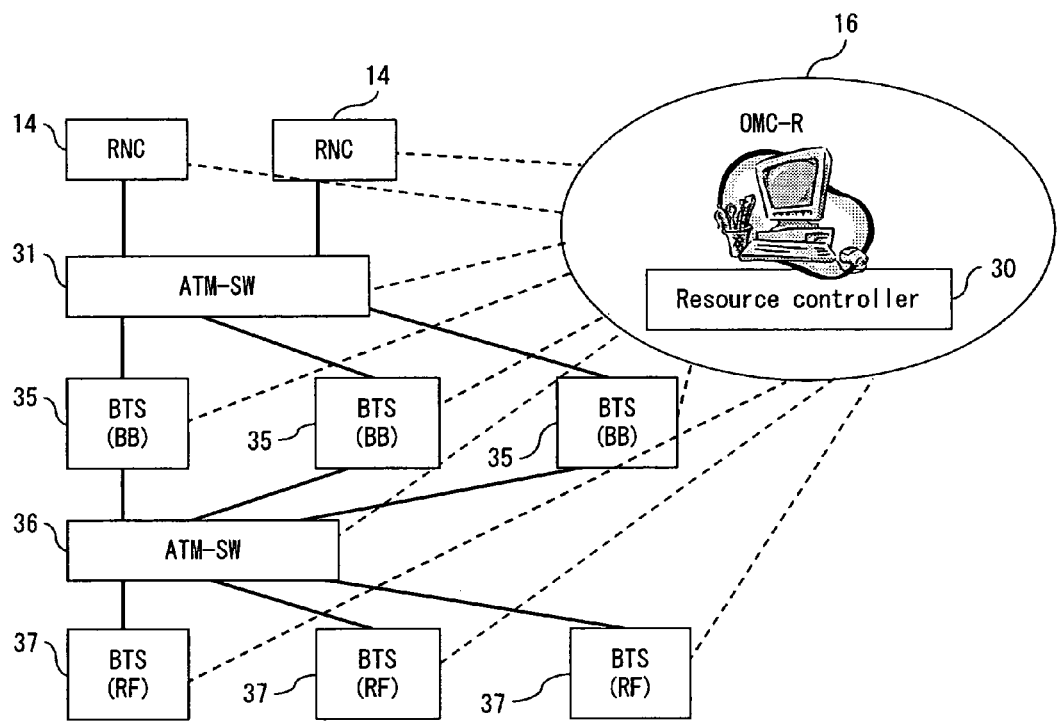
F I G. 5

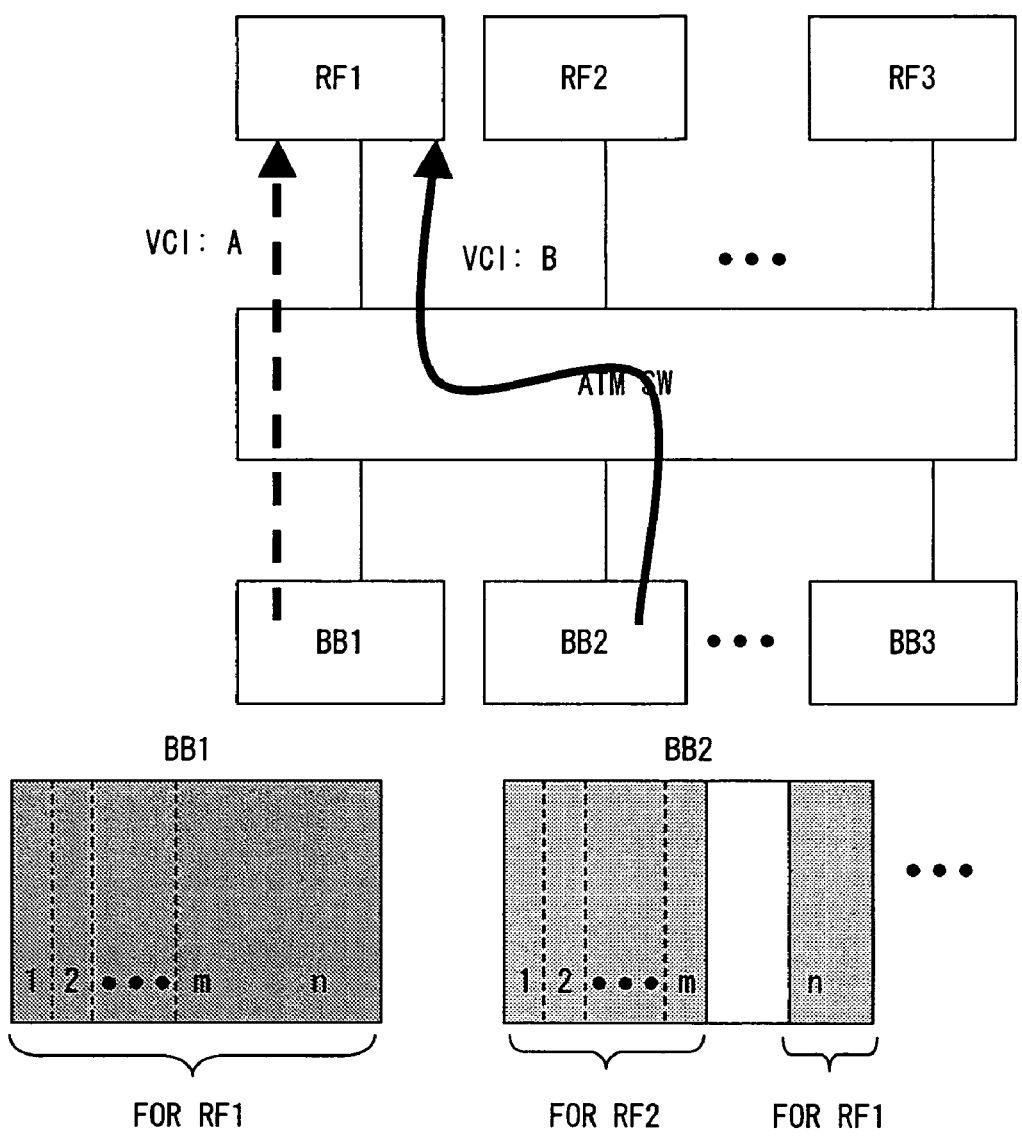
F I G. 7

| No. | BTS (RF) | VCI/VPI | ALLOCATED RESOURCE | AVAILABLE RESOURCE | ... | BTS (RF) | VCI/VPI | ALLOCATED RESOURCE | AVAILABLE RESOURCE |
|---|---|---|---|---|---|---|---|---|---|
| 1 | 1 | 6 / 12 | 64 | 3 | ... | – | – | – | – |
| 2 | 2 | 18 / 3 | 64 | 40 | | 1 | 6 / 13 | 64 | 50 |
| 3 | | | | | | | | | |
| 4 | | | | | | | | | |

FIG. 8

| No. | BTS (BB) | VCI/VPI | ... | BTS (BB) | VCI/VPI |
|---|---|---|---|---|---|
| 1 | 1 | 16 / 12 | ... | 2 | 6 / 13 |
| 2 | 2 | 18 / 3 | | | |
| 3 | | | | | |
| 4 | | | | | |

FIG. 9

| VCI/VPI | condition |
|---|---|
| 6 / 12 | Used |
| 6 / 13 | Used |
|  |  |
| 18 / 3 | Used |
|  |  |
| 18 / 8 | Used |
| 18 / 9 | Un-used |

FIG. 10

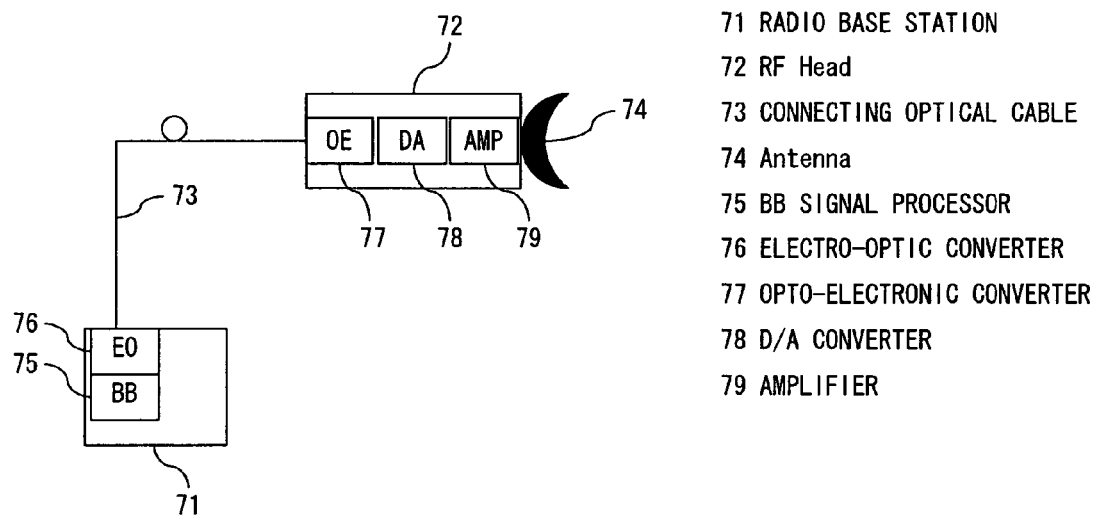
F I G. 1 2

RADIO-CHANNEL CONNECTION CONTROLLER AND MOBILE COMMUNICATION NETWORK SYSTEM

BACKGROUND OF THE INVENTION

1. Field of the Invention

The present invention relates to a mobile communications system. More specifically, it relates to a radio-channel connection controller capable of distributing loads to relieve overloaded states such as a shortage of radio-channels in a given cell or a particular cell or spot inside a mobile radio communication network comprising a plurality of radio base stations. The present invention also relates to a mobile communication network system comprising such a connection controller.

2. Description of the Related Art

In the case of cellular systems using a conventional TDMA (Time Division Multiple Access) method such as GSM (Global System for Mobile Communication) and PDC (Personal Digital Cellular System), it has been necessary to add radio-channels or to add new base stations (mobile stations, etc.) when an overloaded state arises.

A TDMA system has a fixed number of radio-channels connectable through which user data are divided and transmitted by time division. In this system, changes in radio parameters and transmitting power extends its service area only a little. Further, even when reassignment of a radio resource from a cell next to the overloaded cell is tried, such reassignment is basically impossible because of the restriction on the frequency assignment. Accordingly, it has been necessary to provide an exclusive base station such as a micro-cell in an overloaded area of a particular cell. Therefore, a new frequency is required and, where the overloaded state does not occur too often, the utilization rate of equipment is low, which is not economical.

On the contrary, in a cellular system using a CDMA (Code Division Multiple Access) method, user data are divided and transmitted by a code-multiplexing technique. Therefore, the number of channels connectable can be changed according to the communication environment. Further, there is no restriction on the frequency assignment, the same frequency or radio-channel can be used among neighboring cells, and a load can be distributed among the neighboring cells.

Conventional technologies for distributing the load and raising the utilization rate of equipment of radio base stations in the mobile communication network are disclosed in the following documents. [Patent Document 1] Japanese Unexamined Patent Publication No. 8-205227 "Radio Communication system" [Patent Document 2] Japanese Unexamined Patent Publication No. 2000-333257 "System for Setting Path between Mobile Station and Radio Base Station"

The patent document 1 discloses a radio communication system capable of ensuring higher efficient use of a modulator-demodulator. In the radio communications system, a plurality of radio units only sending and receiving calls of radio signals as base stations of a PHS system and a plurality of modulator-demodulators provided in a centralized control station are connected via a connection unit capable of switching the connection. The connecting unit switches the connection per every time period wherein the number of calls in a radio zone differs.

The patent document 2 discloses a technology wherein a repeater or a radio relay unit is provided between neighboring radio base stations. When a cell corresponding to one radio base station is overloaded, the load is distributed between the neighboring radio base stations by using the repeater. Thus, communication capacities of radio base stations receiving fewer calls can effectively be utilized.

However, according to the method of the patent document 1, it is necessary to provide the modulator-demodulator to be shared in the centralized control station in the network. Therefore, this method cannot be applied to load distribution in such a communication network as a conventional network configuration having no centralized control station and a whole set of base transceiver station is provided in a cell site (where a cell is located) corresponding to each cell.

In a case where an overloaded state takes place in a wider area (a group of a plurality of cells), the neighboring radio base stations also become overloaded and a proper load distribution cannot be performed only by distributing the load through the repeater among the neighboring radio base stations as in the patent document 2. Also, the load distribution cannot be performed when a spot of a given size becomes overloaded inside the cell. Further, even if there are resources of a non-neighboring radio base station available, it cannot be utilized. In General, there is required a restriction on the connection of calls when overloaded, lowering communication quality such as a call-connection rate.

SUMMARY OF THE INVENTION

In view of the above, an object of the present invention is to achieve a load distribution in an overloaded state in a wide area and effective use of radio-channel resources of radio base stations corresponding to other non-neighboring cells by dividing a radio base station into, for example, base transceiver stations and antenna systems and by enabling the connection between a plurality of base transceiver stations and a plurality of antenna systems to be optionally changed over.

The radio-channel connection controller of the present invention is provided in a mobile communication network system, and comprises a connection switching unit for switching the connection between a plurality of base transceiver stations and a plurality of antenna systems, and a switching control unit for controlling the switching of the connection by the connection switching unit according to a loaded state in the mobile communication network.

BRIEF DESCRIPTION OF THE DRAWINGS

FIG. 1 is a block diagram showing a principle of a radio-channel connection control method of the present invention;

FIG. 2 is a block diagram showing an overall configuration of a communication network system to which the radio-channel connection control method of the present invention is applied;

FIGS. 3 through 5 are illustrations showing examples of a system configuration including a resource controller;

FIG. 7 is an illustration of one specific example of switching control by the resource controller;

FIG. 8 is an example showing how resource assignment information is stored in a database;

FIG. 9 is an example showing how connection information of BTS is stored;

FIG. 10 is an example showing how connection information of an ATM switch is stored;

FIG. 12 is an illustration showing one example of a construction of an RF head;

DESCRIPTION OF THE PREFERRED EMBODIMENTS

Figure 3:
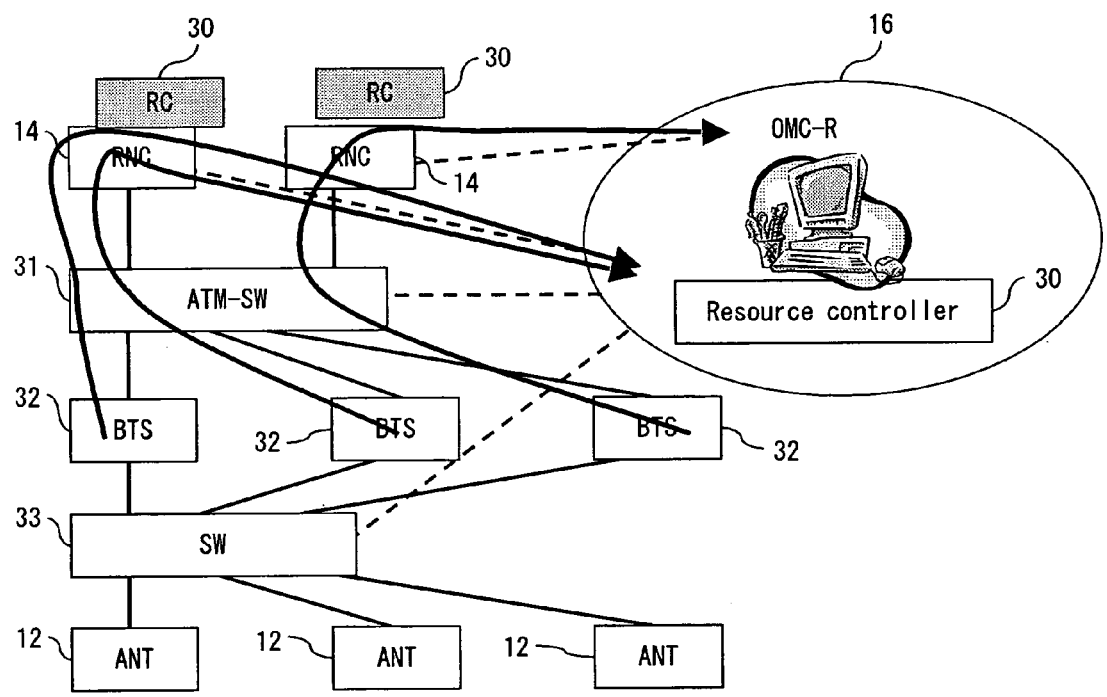

FIG. 1 is a block diagram showing a principle of a radio-channel connection control method of the present invention. FIG. 1 shows the principle of a configuration of a radio-channel connection controller provided in a mobile communication network, and a radio-channel connection controller 1 comprises at least a connection switching unit 4 and a switching control unit 5.

The connection switching unit 4 switches the connection between a plurality of base transceiver stations 2 and a plurality of antenna systems 3. The switching control unit 5 controls the connection switching of the connection switching unit 4 in accordance with a loaded state in the mobile communication network.

Further, the radio-channel connection controller of the present invention comprises a connection switching unit switching the connection between a plurality of the same constituent parts of the plurality of base transceiver stations and a plurality of remaining constituent parts to which antenna systems are respectively connected and making up the rest of the base transceiver stations, and a switching control unit controlling the connection switching of the connection switching unit in accordance with a loaded state in the mobile communication network.

The mobile communication network system of the present invention comprises a plurality of base transceiver stations, a plurality of antenna systems, and a connection switching unit switching the connection between the plurality of base transceiver stations and the plurality of antenna systems.

In one mode for carrying out the invention, at least some of the plurality of antenna systems may be provided near a border between cells in the mobile communication network system. Also, a switching control unit for controlling the connection switching unit may be further provided so as to connect a lightly loaded base transceiver station among the plurality of base transceiver stations with the antenna system provided near the border when a cell whose antenna system is provided near the border is overloaded in the mobile communication network system.

In one mode for carrying out the invention, at least some of the plurality of antenna systems maybe so provided as to cover a spot which is predicted to be overloaded. Also, a switching control unit for controlling the connection switching unit may be so provided as to connect a lightly loaded base transceiver station among the plurality of base transceiver stations with an antenna system so provided as to cover a spot when the spot is overloaded in the mobile communication network system.

Also, in one mode for carrying out the invention, at least some of the plurality of antenna systems are directional variable antenna systems whose directivity can adaptively be varied. Further, a switching control unit for controlling the connection switching unit may be so provided as to connect, when an overloaded state arises at a certain spot in a service area of the mobile communication network system, a lightly loaded base transceiver station among the plurality of base transceiver stations with the directional variable antenna system.

Alternatively, in one mode for carrying out the invention, a plurality of antenna systems and a plurality of base transceiver stations correspond respectively to a plurality of cells making up the mobile communication network. Further, a switching control unit for controlling the connection switching unit may be so provided as to connect an antenna system corresponding to an overloaded cell with a lightly loaded base transceiver station among base transceiver stations corresponding to non-overloaded cells when some of the cells are overloaded in the mobile communication network system.

Further, in one mode for carrying out the invention, the plurality of base transceiver stations comprise a unit corresponding to cells making up the mobile communication network system and an anti-overloading unit which does not have a corresponding cell. Further, in the mobile communication network system, a switching control unit for controlling the connection switching unit may be provided so that at least part of the anti-overloading base transceiver station is connected to an antenna system covering a cell predicted to be overloaded.

Further, according to the present invention, a mobile communication network system wherein communications are conducted in closed spaces such as inside buildings and underground shopping centers comprises a plurality of base transceiver stations, a plurality of antenna systems, and a connection switching unit switching the connection between the plurality of base transceiver stations and the plurality of antenna systems.

Further, the mobile communication network system of the present invention comprises a plurality of the same constituent parts of a plurality of base transceiver stations, a plurality of remaining constituent parts each connected with the antenna system and making up the rest of each base transceiver station, and a connection switching unit switching the connection between the plurality of the same constituent parts and the plurality of the remaining constituent parts.

In one mode for carrying out the present invention, at least some of the remaining constituent parts connected to the antenna system are provided near a border between cells of the mobile communication network. When the cell is overloaded, the control may be so performed as to connect the same constituent part of a lightly loaded base transceiver station among the plurality of the same constituent parts with the remaining constituent parts connected to the antenna system. Alternatively, at least some of the remaining constituent parts connected with the antenna system may be provided in a cell containing a spot expected to be overloaded to cover the spot so that, when the spot is overloaded, the same constituent part of the lightly loaded base transceiver station among the plurality of the same constituent parts may be connected with the remaining constituent parts. Further, the plurality of antenna systems and base transceiver stations correspond to a plurality of cells making up the mobile communication network, and the control maybe so performed as to connect the remaining constituent parts connected to the antenna system provided for a provisional purpose in the base transceiver station corresponding to some of the cells when such cells become overloaded the same constituent parts of the base transceiver stations corresponding to the non-overloaded cells.

Further, in one mode for carrying out the invention, the mobile communication network for communications conducted in closed spaces such as inside buildings and underground shopping centers may comprise a plurality of the same constituent parts of the base transceiver station, the plurality of the remaining constituent parts each connected with the antenna system, and a connection switching unit switching the connection between the plurality of the same constituent parts and the plurality of remaining constituent parts.

According to the present invention, it is possible to resolve an overloaded state by redistributing resources not only between neighboring cells but also among cells in a wider area and to perform load distribution corresponding to a certain spot in the cell. Further, it is possible to make use of resources of the non-neighboring radio base stations and to limit investments on facilities corresponding to total traffic, considerably reducing the cost in the construction of the mobile communication network.

FIG. 2 is a block diagram showing an overall configuration of the mobile communication network system to which the radio-channel control method of the present invention is applied. In FIG. 2, a mobile terminal 11 is connected through an antenna 12 to a node B 13, which is regarded as a logical node in an architecture, and abase transceiver station BTS, which is a physical unit.

The nodes B 13 makes up UTRAN 10 (Universal Terrestrial RAN) as RAN (Radio Access Network) specified by the standard specification organization 3GPP (Third Generation Partnership Project). The nodes B 13 are connected to RNC (Radio Network Control Equipment, radio network controllers) 14 by interfaces Iub in UTRAN 10, and are controlled as a whole by OMC-R (Operation and Maintenance Center-Radio) 16.

RNCs 14 in UTRAN 10 are connected to the internet 23 by the interfaces Iu-PS through SGSN (Serving GPRS Support Node) 21 and GGSN (Gateway GPRS Support Node) 22 in the PS (Packet Switch) Core Network 20.

Further, RNCs 14 are connected to MSC (Mobile Switching Center) 25 in CS (Circuit Switch) Core Network 24 by interfaces Iu-CS. RNCs 14 are also connected to other mobile networks 27 through PSTN (Public Switched Telephone Network) 26. To MSC 25 and SGSN 21, HLR (Home Location Resistor) 28 is connected as a database managing data such as inside-the-sphere information for a mobile terminal.

As described in FIG. 2, the feature of the present mode for carrying out the invention, for example in a W-CDMA system, is to be able to switch connections between resources so that a load may be distributed between the antennas 12 and base transceiver stations corresponding to the nodes B 13. In order to control such an operation, a resource controller is used. FIGS. 3-5 are overall illustrations of a network control method by the resource controller.

FIG. 3 illustrates, when a resource controller 30 is provided in the OMC-R16 of FIG. 2 for example, a physical flow of data between BTS 32 corresponding to the node B13 and the resource controller 30. In FIG. 3, data from the node B13, namely the BTS 32, are given to the resource controller 30 in the OMC-R16 along a physical path shown by the arrow via an ATM-switch 31 and the RNC 14.

In FIG. 3, signaling data and user data shown by a solid line are given to the RNC 14 through the antenna 12, the switch 33, the BTS 32, and the ATM-switch 31. Also, operation-maintenance data and configuration data shown by a dotted line are exchanged between the OMC-R16 and the switch 33, the ATM-switch 31 and the RNC 14.

Further, the resource controller (RC) 30 may be realized as part of the RNC 14 or the ATM-switch 31. Alternatively, for example, it may be a connection control unit formed as one piece with the switch 33. Further, as shown in FIG. 3, its function may be divided into two and given to the OMC-R 16 and the RNC 14, respectively. For example, the connection switching unit of the present invention corresponds to the switch 33, and the switching control unit corresponds to the resource controller 30.

FIG. 4 illustrates a logical connection in the system configuration of FIG. 3. In FIG. 4, a logical connection is established such that the operation-maintenance data and the configuration data shown by a dotted line are also respectively exchanged between the BTS 32 and the OMC-R 16.

FIG. 5 also shows a logical connection as in the FIG. 4. However, unlike the one in FIG. 4, the ATM-switch 36 controls the connection between part of the BTS and the remaining part of the BTS. Namely, BTS (BB) 35 indicates constituent parts up to a baseband signal processor in the BTS, BTS (RF) 37 indicates an RF (Radio Frequency) head to be described later in the BTS, and the BTS (RF) 37 is connected with an antenna.

Figure 6:
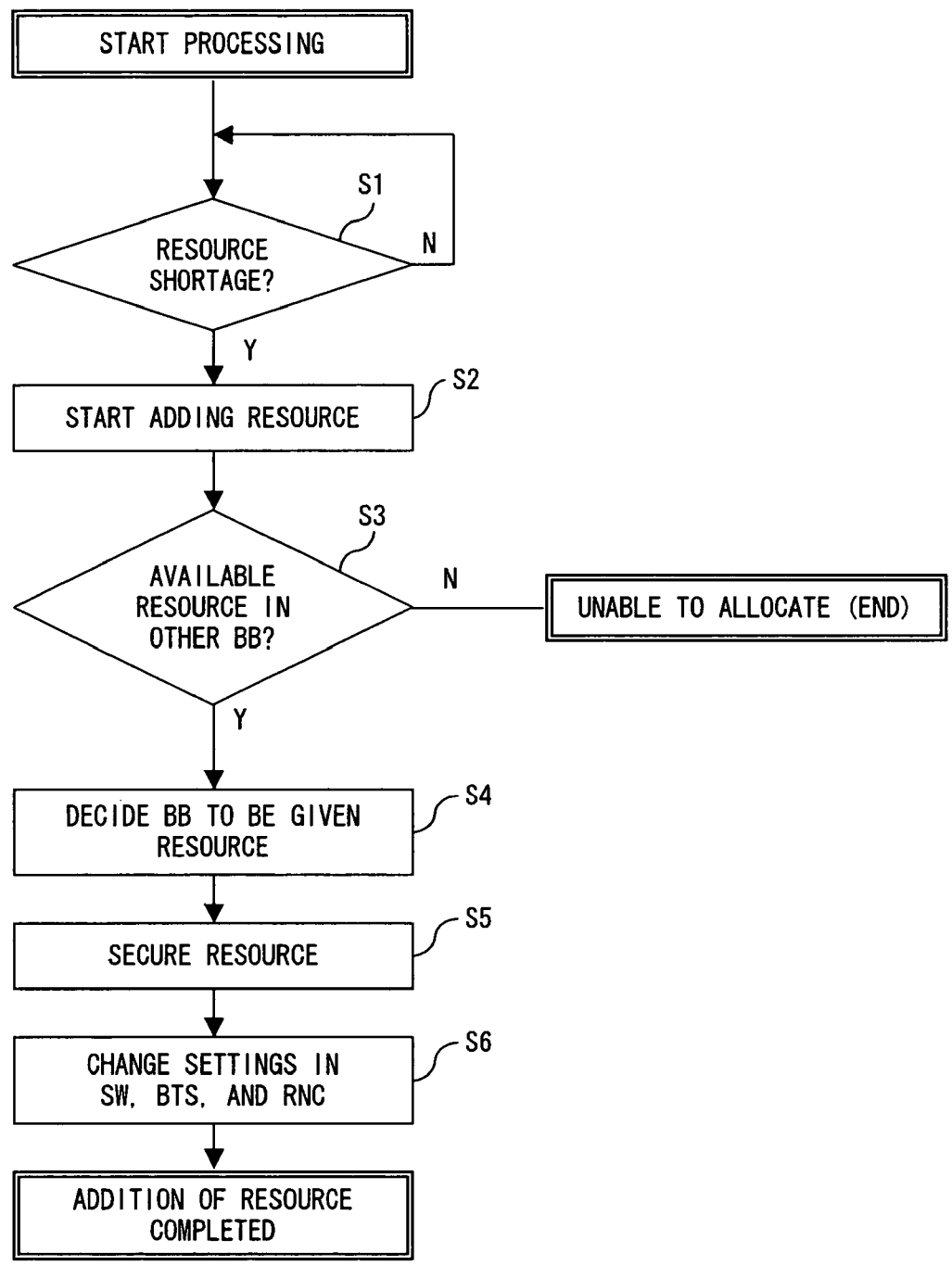
FIG. 6 is a flowchart for explaining control by the resource controller.

FIG. 6 is a flowchart for explaining control by the resource controller, and FIG. 7 is an illustration of one specific example of resource switching by the ATM-switch 36 of FIG. 5. When processing is started in FIG. 6, first, it is determined in step S1 whether there is a resource shortage or not. For example, as shown in FIG. 7, given that BB 1 is connected to RF 1 corresponding to a certain cell by the ATM-switch. If it is determined that "n" number of resources in the BB1 are all used, a load on the cell cannot be taken care of, and there is a resource shortage, in step S2, processing to add resources is started. In the processing to add resources, in step S3, it is determined whether or not there are resources available in other BBs. If there is no available resource, the processing is ended, concluding that additional allocation of the resource is impossible.

As shown in FIG. 7, for example, among the resources in the BB 2, the number of resources in use is m (<n) When it is determined that other resources are available, in step S4, a BB to be given a resource is determined. For example, BB 2 is chosen as a BB to which additional resource is supplied. In step S5, the resource is secured. Further, in step S6, various setting data in the ATM-switch, BTS, and RNC are updated, and the resource-adding processing is completed. In this regard, in FIG. 7, a new VCI (B) is allocated to a path from the BB2 to the RF1 via the ATM-switch, and the connection of the path is established.

FIGS. 8-10 show examples of contents stored in a database of the resource controller including resource allocation information and switch connection information. FIG. 8 shows examples of data stored in the resource allocation information storing table corresponding to the BTS (BB). The table in FIG. 8 contains information about which BTS (RF) 37 are connected to which BTS (BB) 35 No. 1 to No. 4 of FIG. 5, respectively, path information, and how resources are allocated. For example, as described in FIG. 7, information stored is that No. 1 alone of the BTS (RF) is connected to No. 1 of the BTS (BB), the path information VCI/VPI corresponding to its path is 6/12, an allocated resource is 64, and available resource among them is 3. Similarly, it is shown that No. 2 and No. 1 of the BTS (RF) are connected to No. 2 of the BTS (BB).

FIG. 9 shows an example of resource allocation on the part of the BTS (RF), namely, contents stored in the connection information storing data base with respect to the BTS (BB). A number of each BTS (BB) connected to a number of each BTS (RF) and a value of VCI/VPI as connection information are stored there. Further, the contents stored there correspond to FIG. 8, and it is naturally possible to read such data from FIG. 8.

FIG. 10 shows an example of stored data of connection information at the ATM switch. With respect to the value of VCI/VPI as a connection path, information about whether or not the path is connected, namely, used is stored is stored. For example, a path having a VCI/VPI of 6/12 indicates a path connecting No. 1 of the BTS (BB) with No. 1 of the BTS (RF) in FIG. 8, and this path is connected.

Figure 11:
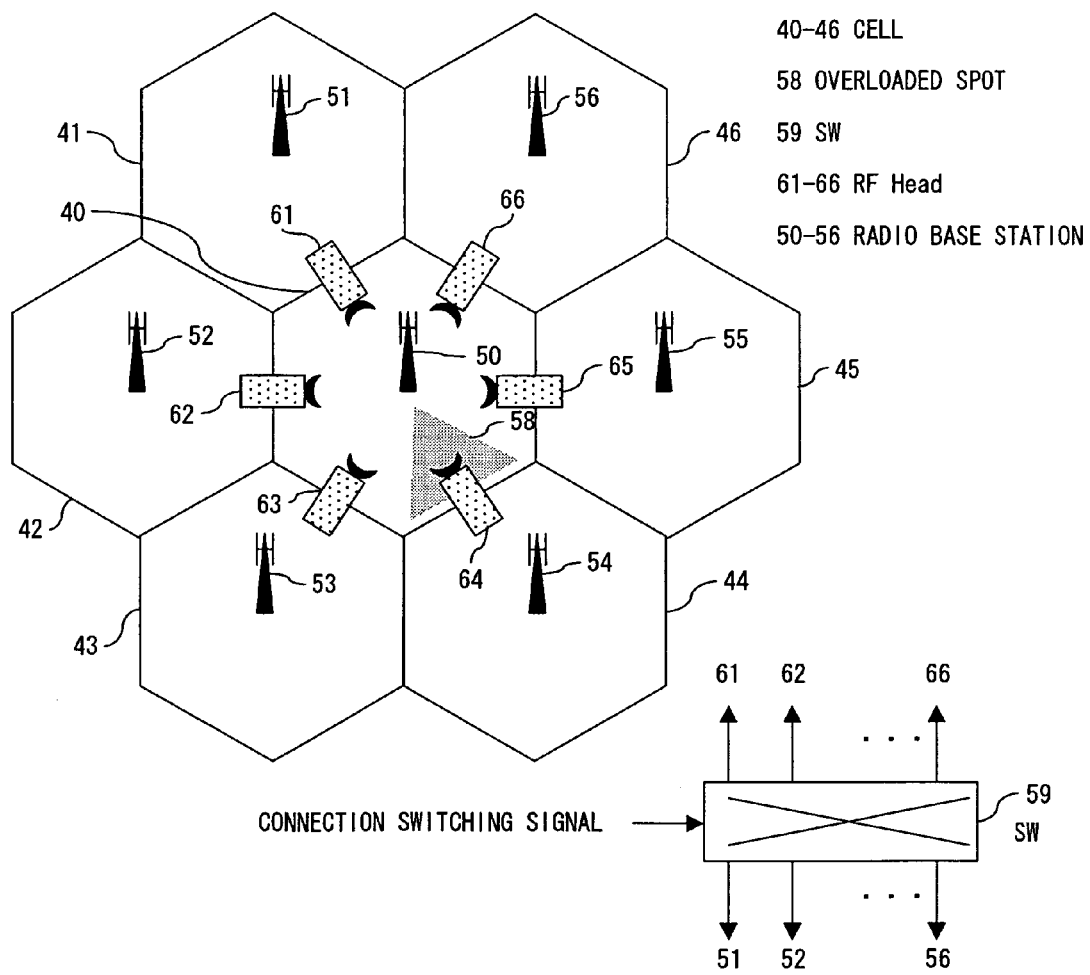
FIG. 11 is an illustration for explaining channel connection control in the first embodiment.

Now, being based on the system configuration and the control by the resource controller described above, embodiments of the radio-channel connection control of the present invention will further be described in detail. FIG. 11 illustrates the connection control of the first embodiment. In FIG. 11, each cell is shown in a form of a hexagon and, there are six cells 41-46 around a cell 40 in the center. Inside the cells, radio base stations 50-56 are provided, each basically being in charge of corresponding cell. It is presumed that the central cell 40 is the one which tends to be overloaded with the radio base station 50 alone. Also, it is presumed that it is completely unknown which area (spot) in the cell 40 is to be overloaded.

Further, it is presumed that RF heads 61-66 capable of outputting radio signals are provided in advance on the borders between the central cell 40 and each of the cells 41-46 around it. It is presumed that RF heads 61-66 are connected to the switch 59, and can be connected to either the radio base station 51-56 corresponding respectively to the cells 41-46 around the central cell 40 or base stations provided in other places. Further, the switch 59 corresponds to a connection switching unit of the present invention, and a switching control unit corresponds to the previously described resource controller which outputs connection switching signals to the switch 59.

FIG. 12 is an illustration showing one example of RF heads 81-66 in FIG. 11. As described in FIG. 5, a radio base station BTS is divided into a base station 71 corresponding to the BTS (BB) 35 and an RF head 72 corresponding to the BTS (RF) 37. The base station 71 and the RF head 72 are connected through a connecting optical cable 73. Also, an antenna 74 is connected to the RF head 72. Further, it is needless to say that the base station 71 and the RF head 72 may be connected through a conventional coaxial cable and a regular RF transmission may be conducted.

There are provided inside the base station 71 are a baseband (BB) signal processor 75 performing baseband processing and an electro-optic converter 76. There are provided inside the RF head 72 connected through the connecting optical cable 73 an opto-electronic converter 71, a D/A converter 78, and an amplifier 79. Further, the base station 77 of FIG. 12 corresponds to "the same constituent part of the base transceiver station", and the RF head 72 corresponds to "the remaining constituent part of the base transceiver station" of the present invention.

In FIG. 11, when an overloaded spot 58 is detected by, for example, the OMC-R16, such a connection switching signal as the one for connecting a lightly loaded radio base station, for example, a radio base station 52, among the radio base stations in the neighborhood and the RF head 64 which should cover the overloaded spot is given to the switch 59. By performing the connection of the switch 59 so that the radio base station 52 covers the overloaded spot 58, the overloaded state can be resolved. For reducing the load, there are a method to switch the call in the overloaded spot 58 already connected to the radio base station 51 to the radio base station 52 through the RF head 64 and a method to connect a new call to the radio base station 52 through the RF head 64. In such cases, as the need arises, a neighbor list indicating radio base stations around the radio base station to which a mobile terminal is currently connected and radio parameters such as radio frequencies can be changed at the same time. Further, the switch 59 may be provided in various places such as a site of a radio base station, the previously described RNC 14, and an exchange.

Figure 13:
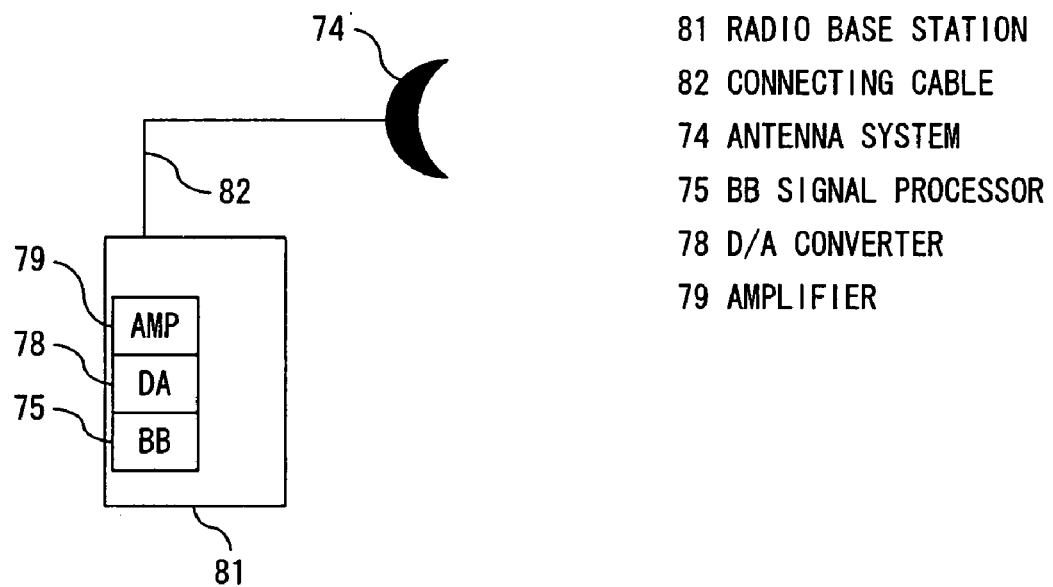
FIG. 13 is an illustration showing one example of a configuration of a radio base station.

In FIG. 11, the RF head is provided in advance on the border between the cells. However, it is naturally possible to provide the antenna system alone on the border between the cells. FIG. 13 is an illustration showing one example of a configuration of a radio base station in such a case. In FIG. 13, the radio base station 81 comprises a baseband signal processor 75, a D/A converter 78, and an amplifier 79, and is connected with an antenna 74 through a connecting cable 82. By placing the antenna 74 alone on the border between the cells and, as in FIG. 11, by switching the connection with the radio base station via the switch 59, the overloaded state of the overloaded spot 58 inside the cell 40 can be resolved like in the case described above.

In this way, in the first embodiment, it becomes possible to effectively use radio-channel resources of the radio base station provided corresponding to other cells. Thus, there is no need to provide, for example, equipment in the centralized control station and to share the equipment in order to relieve the overloaded state.

The first embodiment will be further described. In the first embodiment, resource management and call control management become easier by treating the overloaded spot 58 inside the central cell 40 not as part of the cell 40 but one micro cell.

Figure 14:
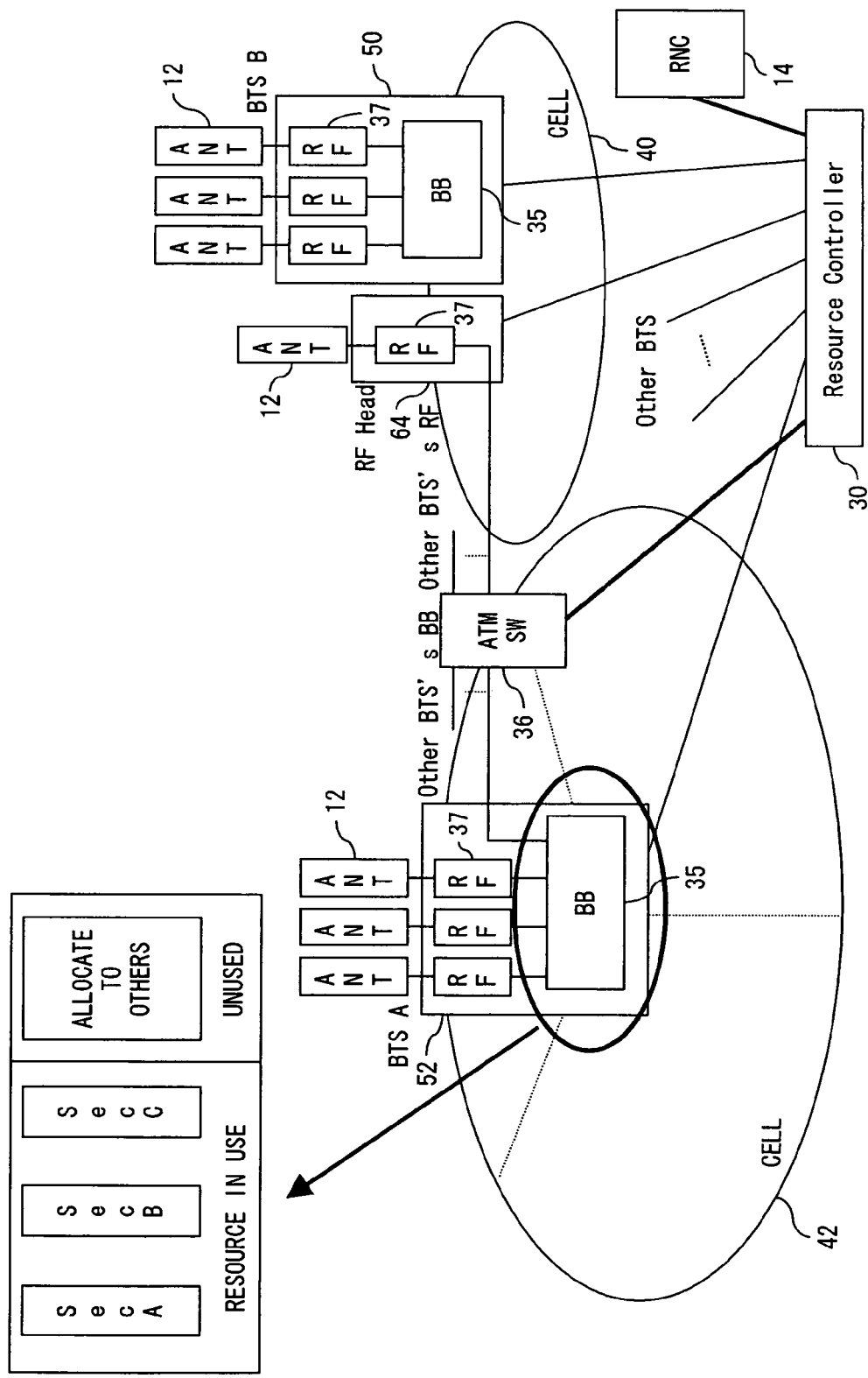
FIG. 14 is a detailed illustration of the channel connection control in the first embodiment.

FIG. 14 is a detailed illustration for explaining resource management of the first embodiment. In FIG. 14, the resource management is performed by a resource controller 30. The resource controller 30 controls the radio base station 50 (BTS B) corresponding to the cell 40, an RF head 64 provided on the border between the cells 40 and 44, the radio base station 52 (BTS A), and an ATM switch 36. Further, the resource controller 30 is connected to the RNC 14.

As described in FIG. 11, it is presumed that among the resource of the BB 35 of the BTS A or the radio base station 52, for example, sectors A to C are in use, each of them connected to the RF head 37 and being used, and that other sectors are not in use and can be allocated to another RF head. Then, these unused sectors are connected to the RF head 64 on the border between the cells 40 and 44 through the ATM switch 36, and are used to cover the overloaded spot 50 on the side of the cell 40. Further, it is presumed that resources of the radio base station 50 (BTS B) corresponding to the cell 40 are all used and cannot be used to cover the overloaded spot. Also, in this case, resources of the BB portion are allocated in advance to each sector. However, it is needless to say that this allocation can be dynamically performed according to the use state of the resources.

Thus, in the first embodiment, the overloaded section 58 is treated as a micro-cell being different from the cells 40 and 42, and resource management of each base station, namely, management of the number of channels as a radio capacity, the RF head, and the BB processing unit, etc. is performed. Therefore, to the unused sectors of the BB 35 to which the RF head 64 is connected, it becomes necessary to assign a frequency which is different from that of other sectors. Even in the case of the same frequency, it is necessary to assign a different scrambling code, namely, the scrambling code which is different from the scrambling code corresponding to the cells 40 and 42. The case where the frequency is the same and a different scrambling code is assigned will be described below.

Figure 15:
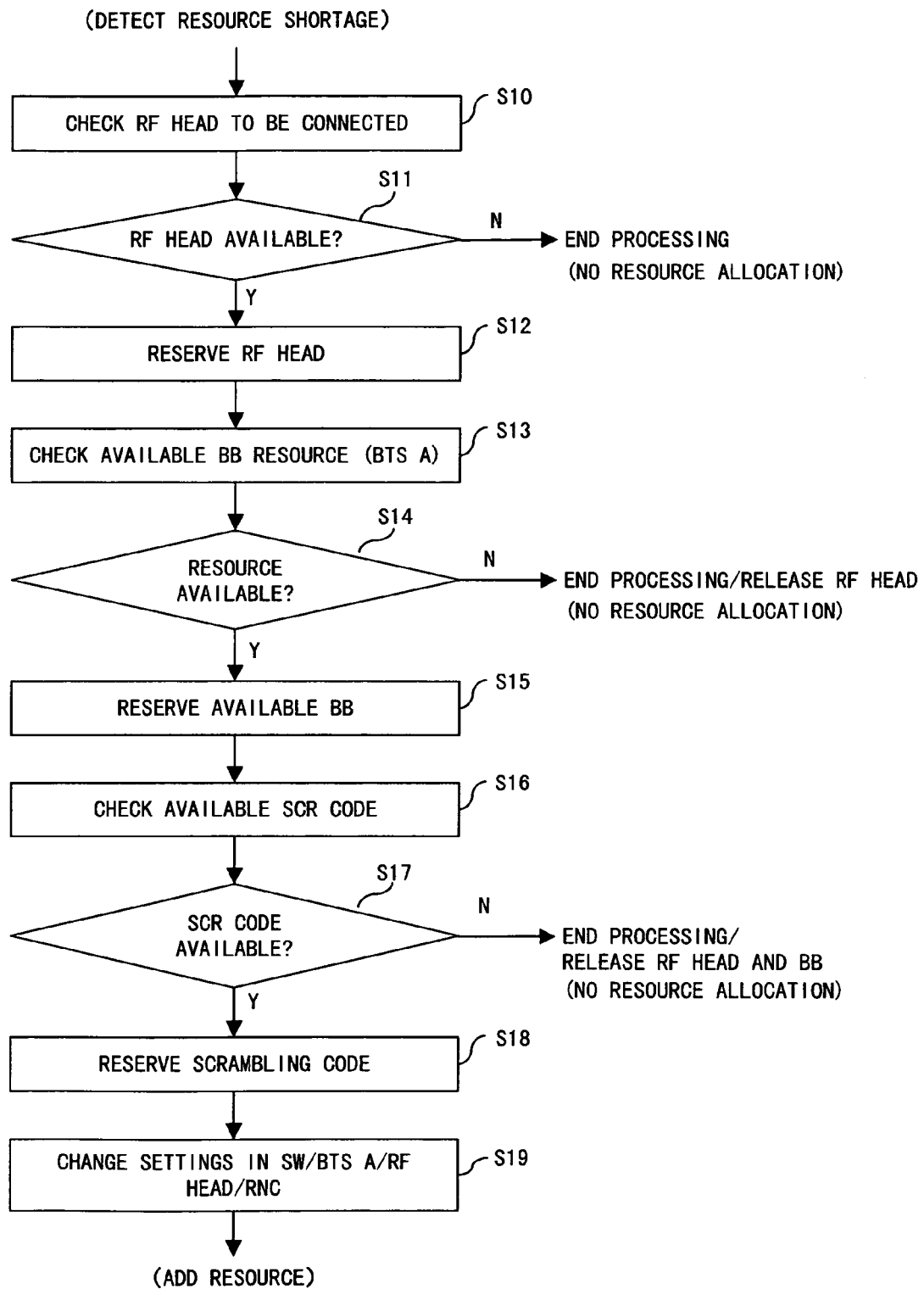
FIG. 15 is a flowchart for explaining resource securing processing in the first embodiment.
Figure 16:
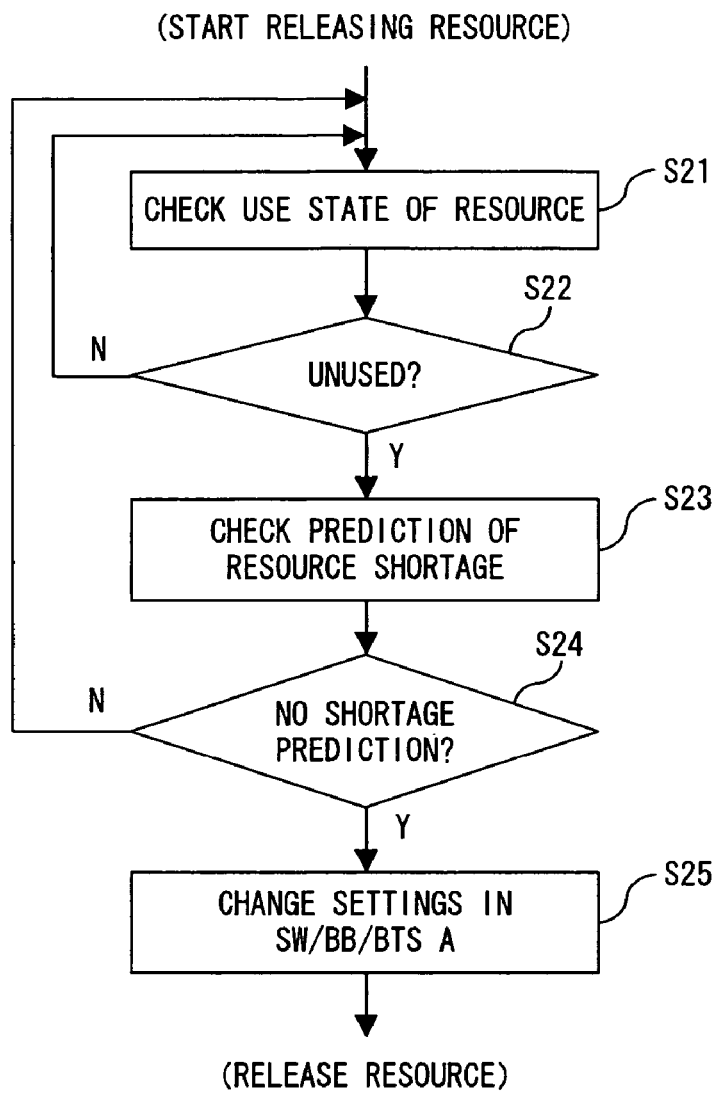
FIG. 16 is a flowchart for explaining resource releasing processing in the first embodiment.

FIGS. 15 and 16 are flowcharts for explaining processing of securing and releasing resources by the resource controller. FIG. 15 is a flowchart for explaining resource securing processing. When a resource shortage, namely, an overloaded state in a certain cell is detected, in step S10, an RF head corresponding to the overloaded spot is checked. When no appropriate RF head is found, a resource cannot be allocated and the processing is ended. When there is an appropriate RF head like the RF head provided on the border between cells in FIG. 11, in step S12, such an RF head is reserved for later use. This is to reserve the RF head until other conditions are checked and the resource is actually used. For example, a reservation is made by placing a reservation bit in the database described in FIG. 8 or by storing the number of reserved resources with respect to the BB resource.

Next, in step S13, availability of the BB resource is checked. For example, in FIG. 14, it is checked whether there is an unused resource on the part of BTS A. When it is determined that there is no unused resource in step S14, a resource cannot be allocated. Therefore, the processing is ended and the RF head reserved in step S12 is released.

When there is an unused resource, the unused resource of the BB is reserved in step S15. Then, in step S16, it is checked whether or not there is any available scrambling code, namely, a scrambling code which is not used at all. The result is judged in step S17, and when there is no available scrambling code, the processing is ended and the reserved RF head and BB resource are released.

When there is available scrambling code, in step S18, the code is reserved. Then, in step S19, setting data of the switch and the BTS A, namely the base station 52, RF head 64, and RNC 14 in FIG. 14 are changed and the resource is added. Further, it is needless to say that the numbers of reservation bits, reserved resources, etc. in the previously described database are changed.

FIG. 16 is a flowchart for explaining resource releasing processing after the overloaded condition is resolved. The resource securing processing in FIG. 15 is performed when the radio capacity of a certain base station, namely, the number of channels is in short, when a heavy load such as an event is predicted, and when, being based on a past traffic data, the periodical heavy load is predicted. When such trigger factors are eliminated, the release of the RF head 64 allocated to the micro-cell described in FIG. 14, the BB resource of the BTS A 52, and the connection between them established by the ATM switch 36 is performed.

The resource releasing of FIG. 16 is started when the resource securing processing of FIG. 15 is over and the resource is added. Then a use state of the resource is checked and when the trigger factors such as the ones described above are eliminated, the resource is released. When the processing is started, in step S21, a use state of the resource is checked, and in step S22, it is determined whether or not the added resource is available. If it is not available, the processing in and after step S21 is repeated.

When it is available, in step S23, a resource shortage prediction is checked. Namely, whether or not a resource shortage is predicted in the future is checked by, for example, whether or not the time period for which the event is held is over, and whether or not the shortage will be resolved in the future is determined in step S24. When the shortage has not been resolved, the processing in and after step S21 is repeated. Alternatively, when it is made sure that the shortage is resolved, in step S25, setting data of the switch, BB, and BTS A, etc. are changed, and the resource is released.

Figure 17:
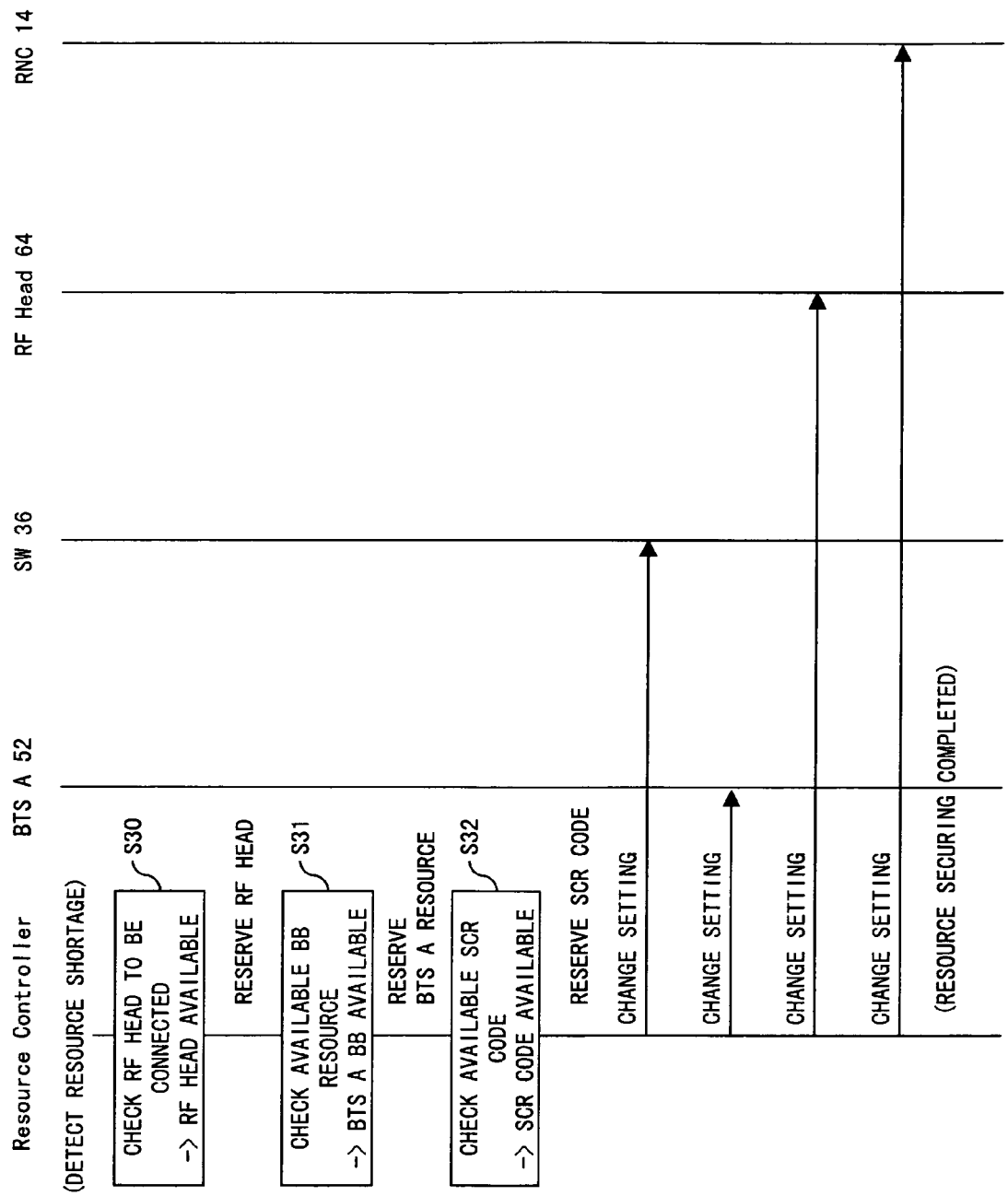
FIG. 17 is an illustration for explaining a resource securing sequence in the first embodiment.
Figure 18:
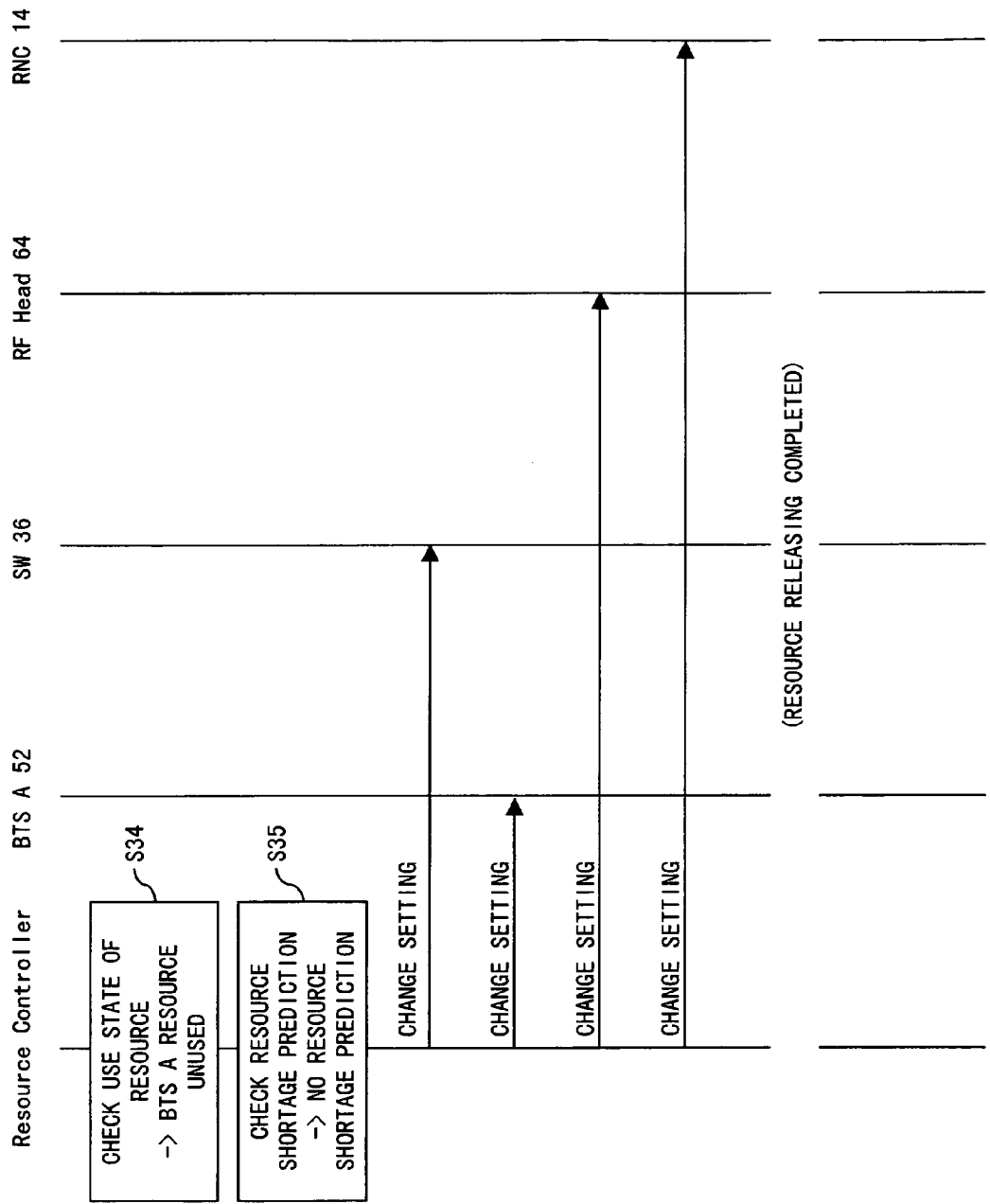
FIG. 18 is an illustration for explaining a resource releasing sequence in the first embodiment.

FIGS. 17 and 18 are illustrations for explaining sequences of the resource securing and resource releasing. FIG. 17 shows a resource securing sequence. When a resource shortage is detected, in step S30, it is checked by the resource controller whether or not there is an appropriate RF head to be connected. When it is determined that there is such an RF head, the RF head is reserved and, in step S31, it is checked whether there is a usable BB resource. If there is an available BB resource in the BTS A, such a resource is reserved. In step S32, a scrambling code is checked. If there is an available scrambling code, such a code is reserved. Then to the switch 36, BTS A52, RF head 64, and RNC 14, instructions to change their setting data are given, and the resource securing sequence is completed.

FIG. 18 is an illustration for explaining a resource releasing sequence. When a resource is added as described above, in step S34, a use state of the added resource is checked by the resource controller 30. When it is determined that the resource of the BTS A52 added is unused, instep S35, a prediction of a resource shortage is checked. When it is determined that the shortage in the future is not predicted, instructions to change setting data are given to the switch 36, BTS A52, RF head 64, and RNC 14, completing the release of the resource.

Figure 19:
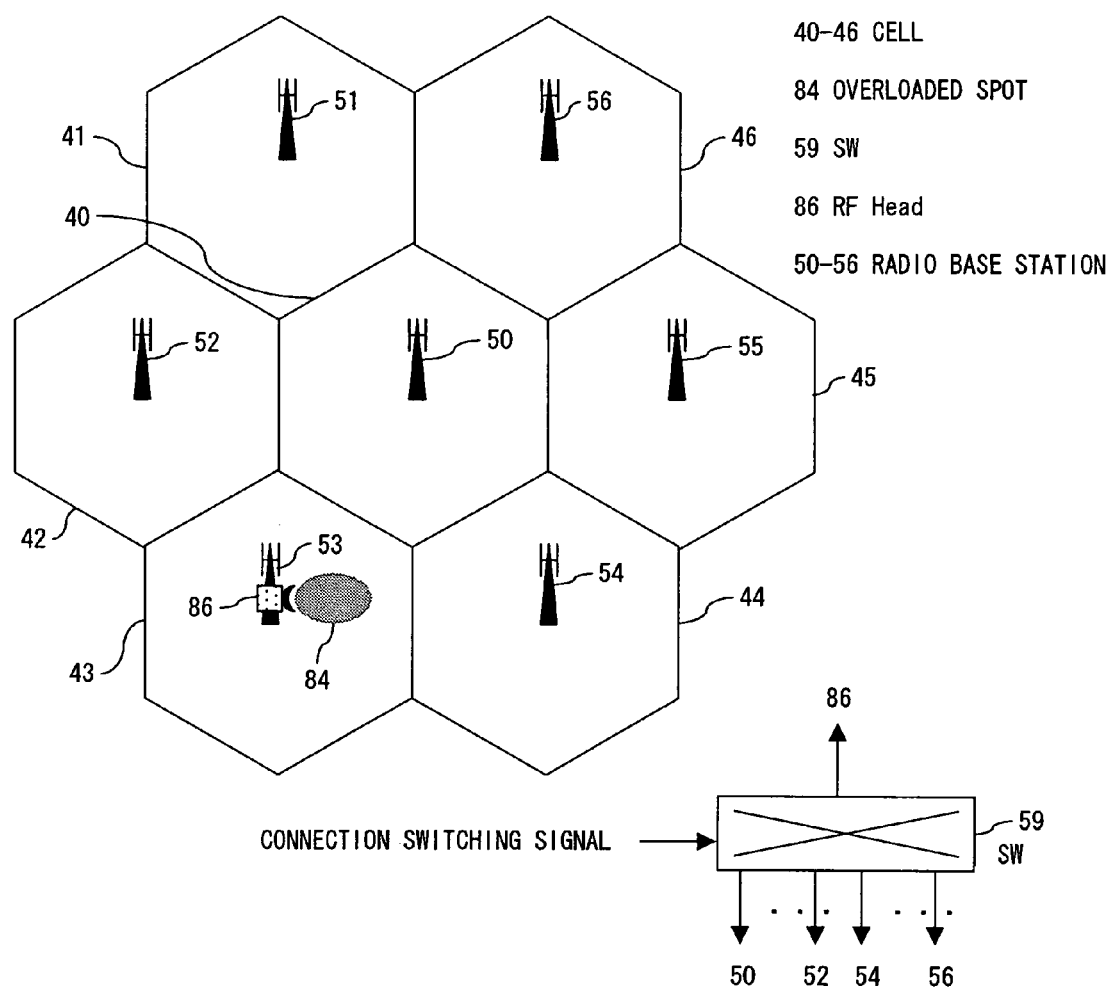
FIG. 19 is an illustration for explaining channel connection control in the second embodiment.

Another embodiment of the radio-channel connection control method of the invention will be described. FIG. 19 is an illustration for the second embodiment. In the second embodiment, it is presumed that it is known that a particular spot in a particular cell tends to be overloaded and an RF head capable of outputting a radio signal to cover that spot is provided in advance.

Namely, suppose there is a spot 84 inside a cell 43 which tends to be overloaded, an RF head 86 is provided to cover the spot, and to this RF head 86, the connection can be optionally switched by the switch 59 between the radio base station 50 to 52 and 54 to 56.

When an overloaded state of the spot 84 is detected in a system, a lightly loaded radio base station, for example, the radio base station 52 and the RF head 86 are connected by the switch 59 so that the radio base station 52 covers the overloaded spot 84. Thus, it becomes possible to reduce the load in the overloaded spot.

Figure 20:
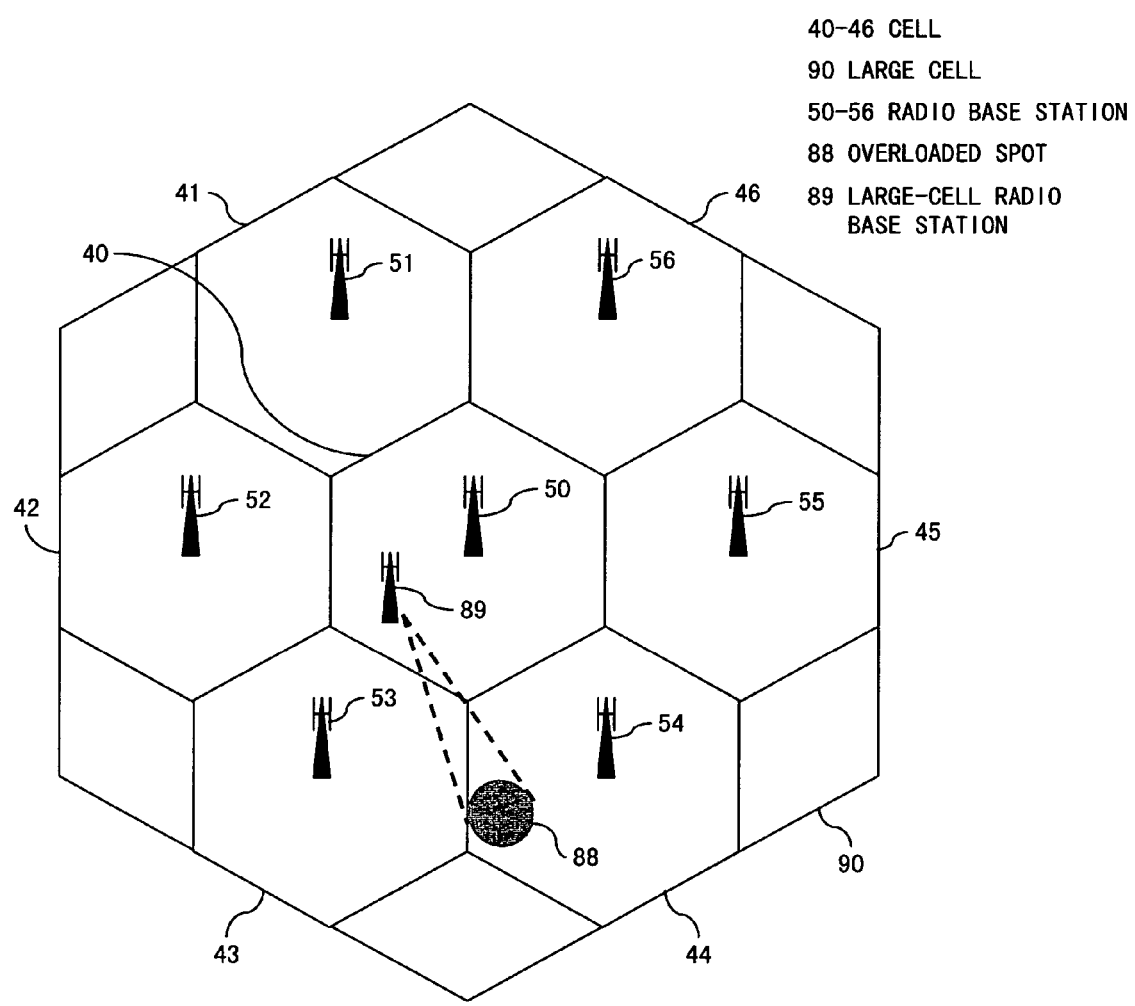
FIG. 20 is an illustration for explaining channel connection control in the third embodiment.

FIG. 20 is an illustration for the third embodiment. The third embodiment is to cover a certain overloaded spot in an area of a large cell by using an antenna capable of adaptively changing the directivity in a given direction, such as an adaptive array antenna, so that the load in the overloaded spot is reduced.

In FIG. 20, for example, inside the central cell 40, in addition to the radio base station 50, a radio base station 89 with a greater outputting capacity is provided. The radio base station 89 is capable of reducing the load in an overloaded spot 88 in a certain position by outputting a radio wave in the direction of the overloaded spot 88 inside a large cell 90 covering all the seven cells described in FIG. 11. Namely, when the overloaded spot 88 is detected by the system, an overloaded state of the overloaded spot 88 is resolved by turning the directivity of the adaptive array antenna in that direction, making it possible to reduce the load in the radio base station 54. Alternatively, it is naturally possible to connect the adaptive array antenna with a lightly loaded radio base station, such as a base station 52, by a switch.

Figure 21:
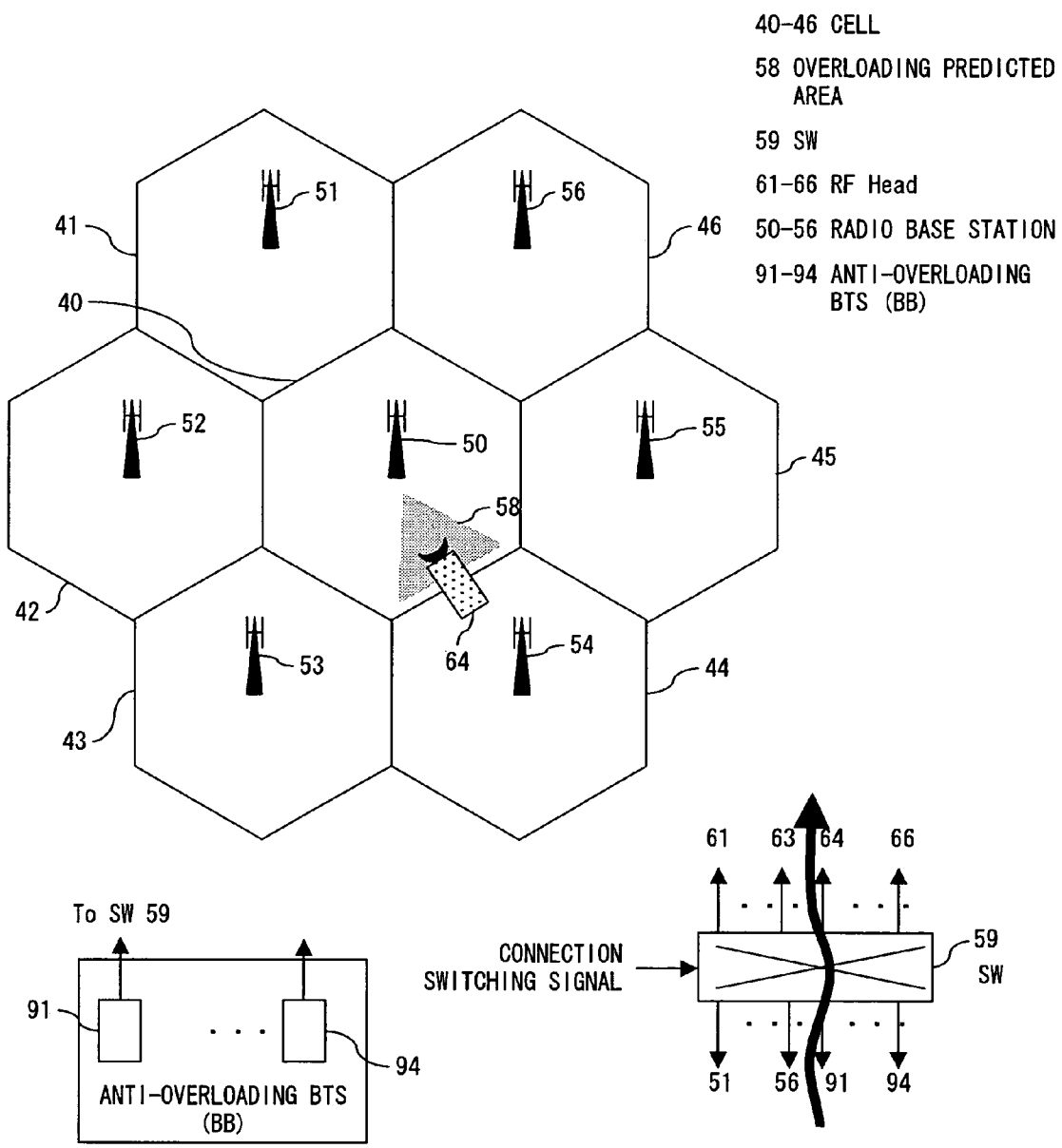
FIG. 21 is an illustration for explaining channel connection control in the forth embodiment.

FIG. 21 is an illustration for the fourth embodiment. In the fourth embodiment, it is presumed that base transceiver stations serving as anti-overloading measures and to which any particular cell is not assigned in advance are provided, and that those radio base stations, namely, in FIG. 21, the BTS (BB) 91-94 serving as anti-overloading measures are, in addition to the radio base stations 51-56, connected with the switch 59. Further, it is presumed that, as in FIG. 11, RF heads 61-66 provided on the border between cells are connected to the switch 59, respectively (RF 61-63, 65, 66 are omitted in FIG. 11).

In the fourth embodiment, among the six RF heads provided on the border between the cells, to the RF head 64 which can cover an overloaded spot predicted on the basis of the past traffic data by the OMC-R 16 or the resource controller 30, or an overloaded spot 58 predicted by an event schedule, one of the BTS 91-94 serving as anti-overloading measures, for example, the BTS 91 is connected by the switch 59 so that the load in the overloaded spot can be reduced in advance.

Thus, according to the fourth embodiment, the BTS serving as an anti-overloading measure relieves an overloaded state at a spot where temporary overloading is predicted. The overloaded spot moves, for example, over time. Therefore, the BTS serving as anti-overloading measure is used partly or completely according to a date and time, for example. In FIG. 21, four base transceiver stations are used for anti-overloading. However, it is needless to say that the number of the base transceiver stations is not limited to four.

Figure 22:
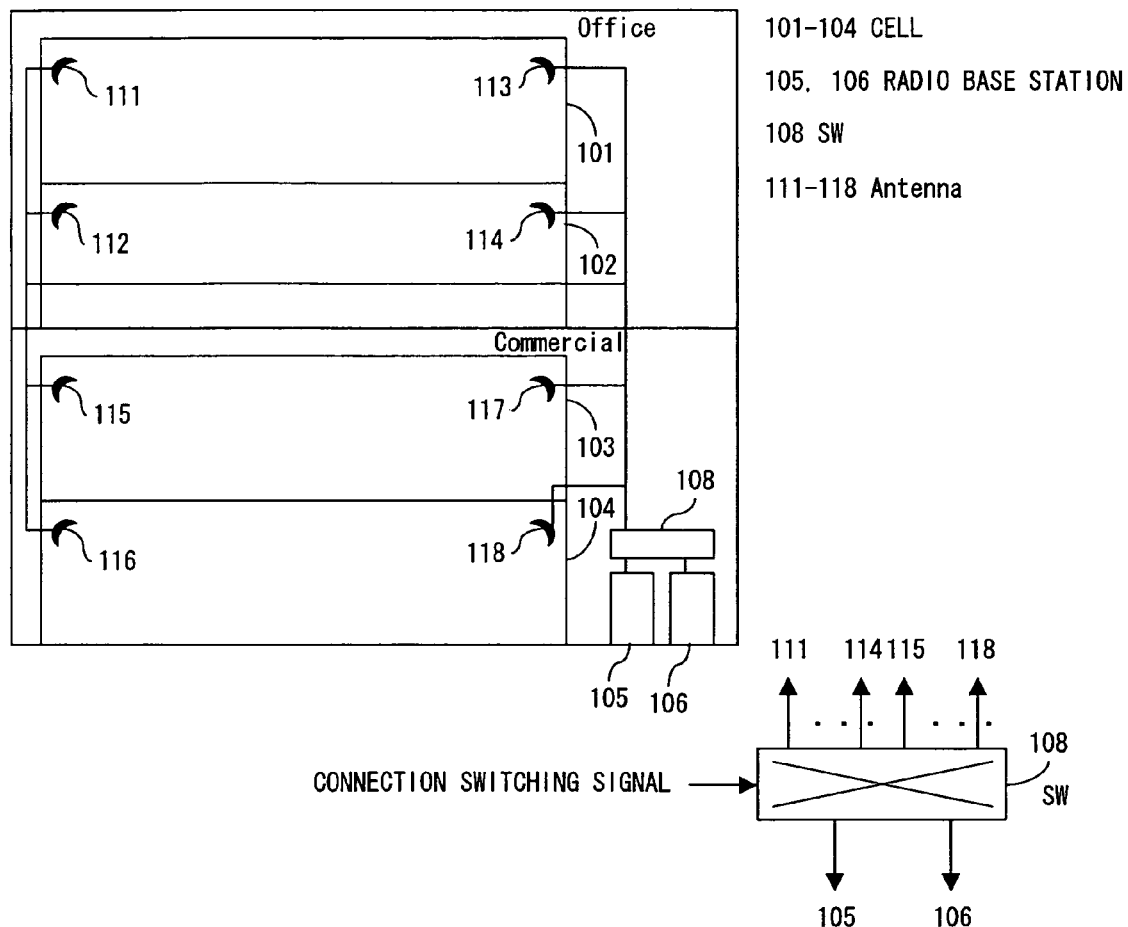
FIG. 22 is an illustration for explaining channel connection control in the fifth embodiment.

Finally, the fifth embodiment will be described. The fifth embodiment is about radio-channel connection control in closed spaces such inside buildings and underground shopping centers. FIG. 22 is an illustration for explaining a channel-connection control method inside a building. In FIG. 22, the inside of the building is divided into an office area and a commercial area. The office area comprises cells 101 and 102, and the commercial area comprises cells 103 and 104. Antennas 111-118 inside the cells are enabled to be connected to either of the radio base stations 105 and 106 through the switch 108. It appears that eight antennas 111-118 are connected to the switch 108 by a single cable. But, in fact, as shown in the lower right section, the switch 108 and the antennas 111-118 are connected by respective individual lines.

It is presumed that, normally, for example, on weekdays, the cells 101 and 102 making up the office area are covered by the radio base station 105, and the cells 103 and 104 of the commercial area are covered by the radio base station 106.

In the case of weekends, when a load is reduced in the office area and a load is increased in the commercial area, if the overloaded state of the cells 103 and 104 is detected by the system, a connection switching signal is sent to the switch 108. Then, the load can be reduced, for example, when antennas 115 and 117 corresponding to the cell 103 are additionally connected to the radio base station 105. Alternatively, the load can be reduced when the antenna 115 is additionally connected to the radio base station 105 and the cell 103 corresponding to the radio base station 106 is shared with the radio base station 105.

In the former case, both the radio base stations 105 and 106 are connected to the antennas 115 and 117, the cell 103 being covered by both the radio base stations 105 and 106. In the latter case, both the radio base stations 105 and 106 are connected to the antenna 115, part of the cell 103 being covered by both the two radio base stations 105 and 106. In the case of such switching of connection, as described in the first embodiment, radio parameters such as a neighbor list and radio frequencies have to the changed at the same time as the need arises. Thus, according to the present embodiment, it is possible to connect a plurality of radio base stations to one antenna at the same time, contributing to the effective use of resources in various manners.

Also, the switch 108 in FIG. 22 basically distributes analog signals. For example, such a method is conceivable that an optical signal is transmitted halfway in a large building and is converted to an electric signal by an RF unit of the CDMA system, for example. However, it is regarded here that it serves the purpose if analog signals are properly distributed.

Figure 23:
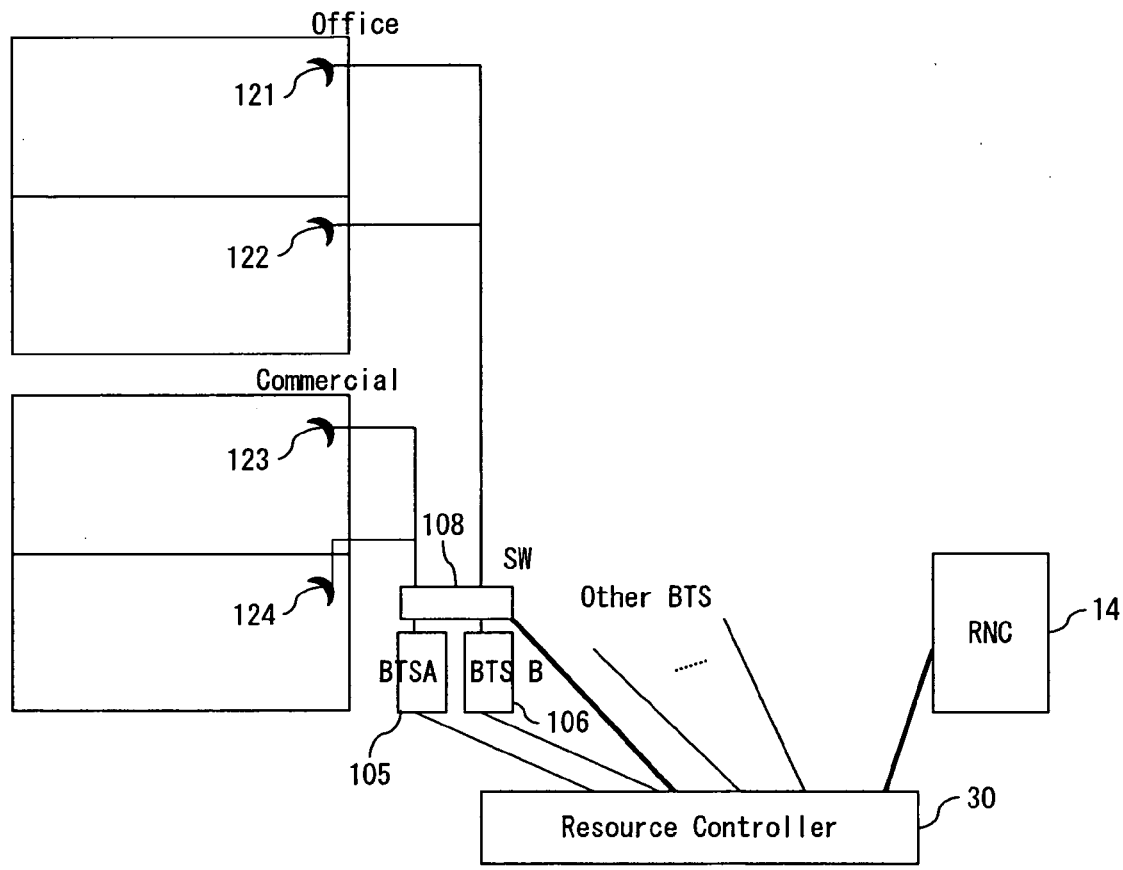
FIG. 23 is a detailed illustration of the channel connection control in the fifth embodiment.

Now, referring to FIGS. 23-27, the channel connection control in the fifth embodiment will be further described in detail. FIG. 23 is a detailed illustration of the connection switching control as in FIG. 14 of the first embodiment. It is presumed that, for the simplicity of description, each cell is provided with each one of the antennas 121 to 124. Also, like the description of FIG. 22, antennas 121 to 124 are each connected to the switch 108.

As previously described, when an overloaded state is detected in the commercial area, the radio base station 106 normally covering the office area is connected also to the antenna 123, for example. Thus, the cell of the existing radio base station 106 is extended to the area of the existing radio base station 105. Namely, on the side of the existing radio base station 106, part of the cover area of the radio base station 105 is added to its original cover area. Such an addition of the resource is conducted when a radio capacity of an area covered by the radio base station 105, for example, the number of channels is not enough. This means an extension of the cell of the radio base station 106. Therefore, when adding the resource, the scrambling code which is the same as the one originally used in the radio base station 106 is used. Being based on such conditions, resource management at each base station, and the instruction to the switch, BTS and RNC for changing data setting are made.

Figure 24:
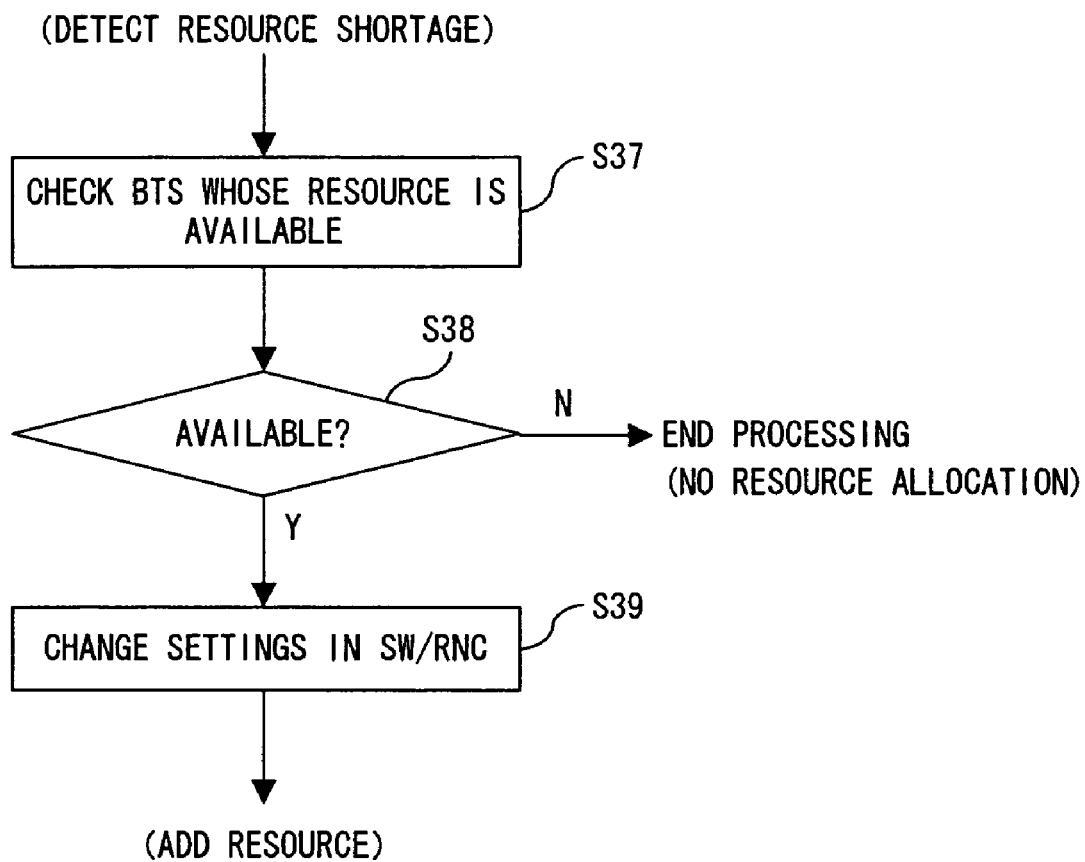
FIG. 24 is a flowchart for explaining resource securing processing in the fifth embodiment.

FIGS. 24-27 are flowcharts of resource securing and resource releasing, and illustrations for explaining sequences in the fifth embodiment. FIG. 24 is a flowchart for explaining resource securing processing. When a resource shortage is detected, in step S37, a BTS with an available resource is checked. In step S38, it is determined whether there is such a BTS or not. When there is none, the processing is ended without allocating resources. When there is, in step S39, settings of the switch and RNC 14 are changed and the addition of resources is ended.

Figure 25:
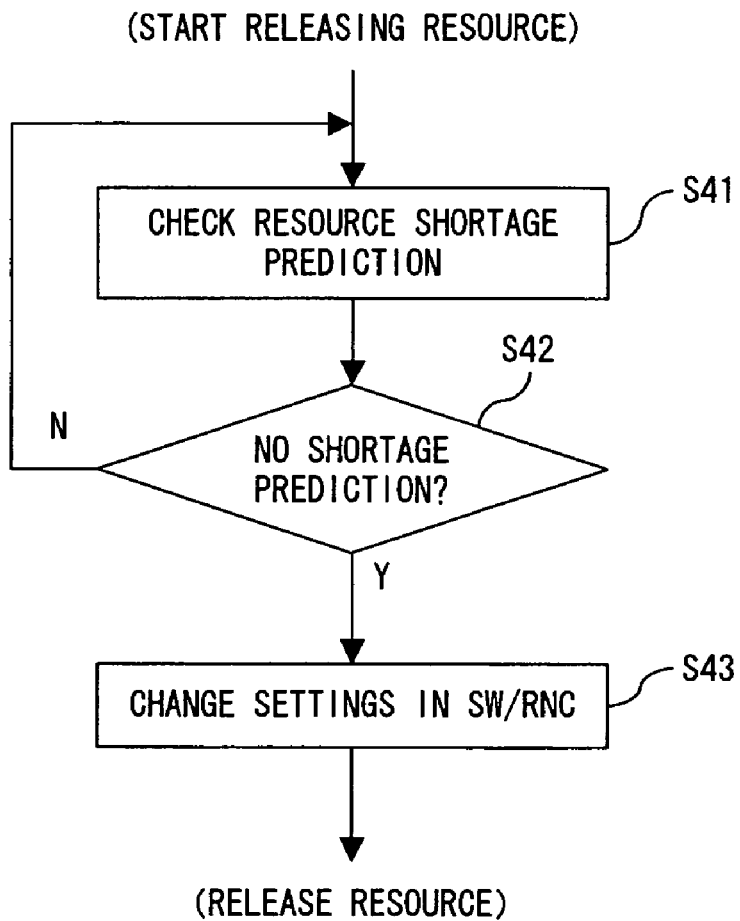
FIG. 25 is a flowchart for explaining resource releasing processing in the fifth embodiment.

FIG. 25 is a flowchart for explaining resource releasing processing. This resource releasing processing is, for example, started right after the end of the resource addition in FIG. 24. When the prediction of a resource shortage is checked in step S41 and if it is determined in step S42 that the shortage is predicted, the processing in step S41 is repeated. When it is determined that the shortage is not predicted, in step S43, settings of the switch and RNC 14 are changed and the resource is released.

Figure 26:
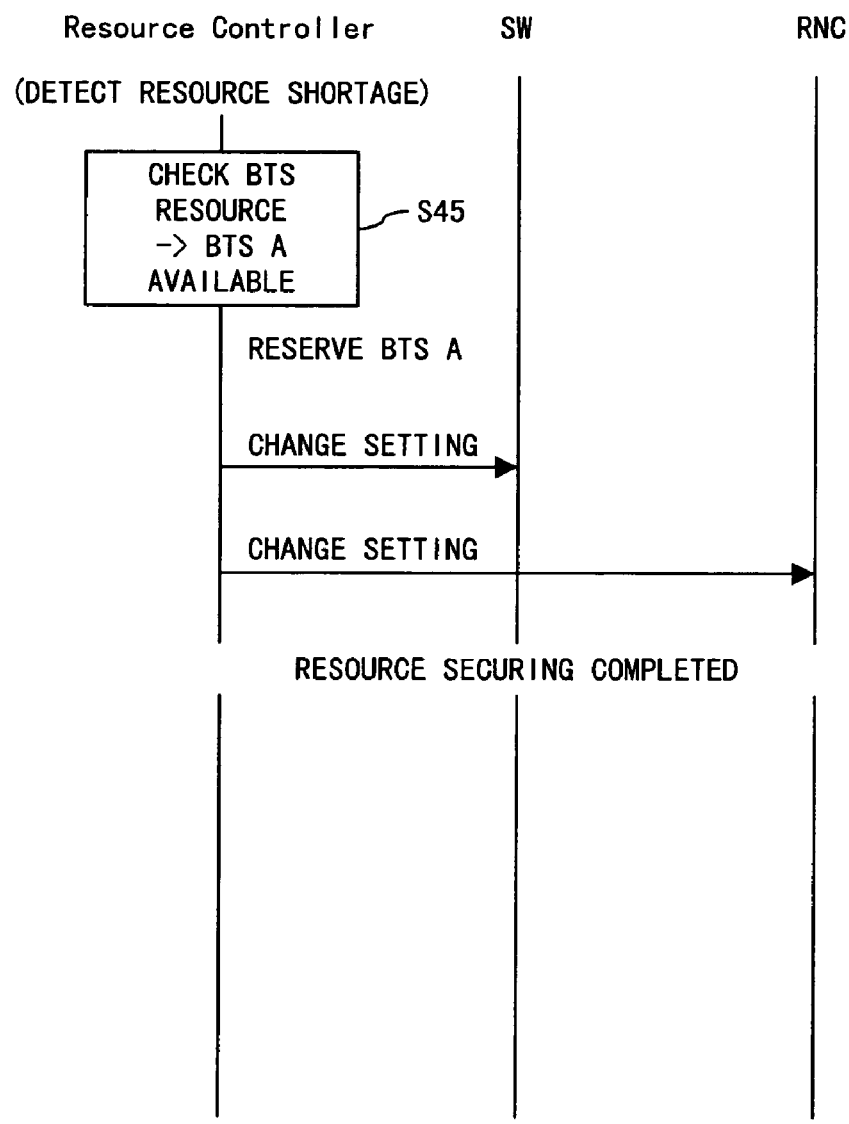
FIG. 26 is an illustration for explaining a resource securing sequence in the fifth embodiment.

FIG. 26 is an illustration for explaining a resource securing sequence in the fifth embodiment. In FIG. 26, when a resource shortage is detected by the resource controller, in step S45, available resources of the BTS are checked. When there is an available resource in BTS A, such a resource is reserved. Then instructions to change settings are given to the switch, RNC, etc. and the resource securing is completed.

Figure 27:
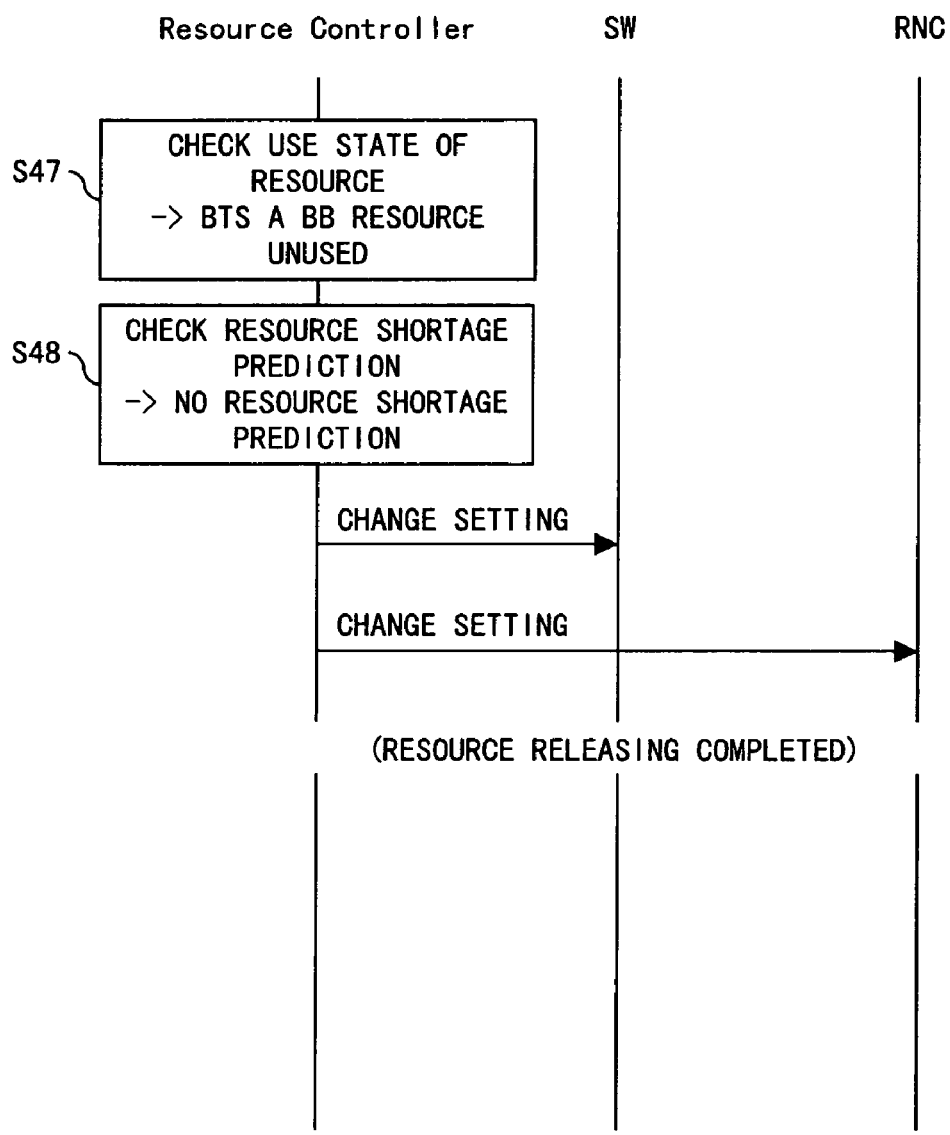
FIG. 27 is an illustration for explaining a resource releasing sequence in the fifth embodiment.

FIG. 27 is an illustration for explaining a resource releasing sequence. In FIG. 27, a use state of the resource is checked in step S47 by the resource controller. When it is made sure that the BB resource of the BTS A is not used, in step S48, the prediction of a resource shortage is checked. When the shortage is not predicted, instructions are given so as to change settings of the switch, RNC, etc., and the resource releasing is completed. Further, in the fifth embodiment, the connection between the base transceiver station or BTS and the antenna is changed over by the switch. However, like in the first embodiment, it is naturally possible to switch the connection between the BTS up to the BB processor and the RF head.

As described above in detail, according to the present invention, it becomes possible to resolve the overloaded state by re-allocating resources covering a wide area which has not been taken care of by a conventional method of using a repeater, and to perform load distribution in a certain spot inside a cell. Further, it becomes possible to make use of resources of non-neighboring lightly loaded radio base stations, enabling a facility investment according to a total traffic in a wide area and achieving an economical construction of the mobile communication network. Further, by using the adaptive array antenna, an overload in an area (at a spot) where overloading is not predicted can flexibly be taken care of, contributing considerably to the improvement of the customer service.

So far, the embodiments have been described, taking the W-CDMA method as an example. However, it is needless to say that the present invention can be applied to the CDMA 2000 and other methods. Further, it can be applied to various types of radio base station monitors which are in charge of resource management of radio base stations in mobile radio communications in general.

What is claimed is:

1. A radio-channel connection controller provided in a mobile communication network, said radio-channel connection controller comprising:
a connection switching unit that switches the connection between a plurality of base transceiver stations and a plurality of antenna systems; and
a switching control unit that controls the switching of said connection switching unit corresponding to a loaded state in the mobile communication network; wherein
said connection switching unit that switches one of said antenna systems connected to one of said base transceiver stations with base transceiver stations which are in non-neighboring cells from the entirety of the network;
wherein:
a unit including a base station transceiver station is different than a unit including an antenna system and wherein each of the plurality of antenna systems is located in a different location than each of the base transceiver stations;
a base transceiver station in a non-neighboring cell achieves a load distribution;
the radio-channel connection controller distributes said load by selecting at least a portion of said base transceiver station from non-neighboring cells from the entirety of the network and connecting it to the antenna system in the area of said load;
and wherein the base transceiver stations do not have antennas.

2. A radio-channel connection controller provided in a mobile communication network, said radio-channel connection controller comprising:
a connection switching unit that switches the connection between a plurality of the same constituent parts of a plurality of base transceiver stations and a plurality of remaining constituent parts each connected to an antenna system and making up the rest of each base transceiver station; and
a switching control unit that controls the switching of said connection switching unit corresponding to a loaded state in the mobile communication network; wherein
said connection switching unit that switches one of said antenna systems connected to one of said base transceiver stations with base transceiver stations which are in non-neighboring cells from the entirety of the network;
wherein:
a unit including a base station transceiver station is different than a unit including, an antenna system, and wherein each of the plurality of antenna systems is located in a different location than each of the base transceiver stations;
a base transceiver station in a non-neighboring cell achieves a load distribution;
the radio-channel connection controller distributes said load by selecting at least a portion of said base transceiver station from non-neighboring cells from the entirety of the network and connecting it to the antenna system in the area of said load;
and wherein the base transceiver stations do not have antennas.

3. A mobile communication network system, comprising:
a plurality of base transceiver stations;
a plurality of antenna systems; and
a connection switching unit that switches the connection between said plurality of base transceiver stations and said plurality of antenna systems; wherein
said connection switching unit that switches one of said antenna systems connected to one of said base transceiver stations with base transceiver stations which are in non-neighboring cells from the entirety of the network;
wherein:
a unit including a base station transceiver station is different than a unit including an antenna system, and wherein each of the plurality of antenna systems is located in a different location than each of the base transceiver stations;
a base transceiver station in a non-neighboring cell achieves a load distribution;
the radio-channel connection controller distributes said load by selecting at least a portion of said base transceiver station from non-neighboring cells from the entirety of the network and connecting it to the antenna system in the area of said load;
and wherein the base transceiver stations do not have antennas.

4. The mobile communication network system according to claim 3, wherein
at least some of said plurality of antenna systems are provided near a border between cells of the mobile communication network system, and wherein said mobile communication network system further comprises a switching control unit that controls said connection switching unit so that a lightly loaded base transceiver station among said plurality of base transceiver stations and the antenna system provided near the border are connected when the cell in which the antenna system is provided near the border is overloaded.

5. The mobile communication network system according to claim 3, wherein
at least some of said plurality of antenna systems are so provided as to cover a spot predicted to be overloaded, and wherein
said mobile communication network system further comprises a switching control unit that controls said connection switching unit so that a lightly loaded base transceiver station among said plurality of base transceiver stations and the antenna system so provided as to cover the spot are connected when the spot is overloaded.

6. The mobile communication network system according to claim 3, wherein
said plurality of antenna systems and plurality of base transceiver stations respectively correspond to cells making up the mobile communication network, and wherein
said mobile communication network system further comprises a switching control unit that controls said connection switching unit so that, when some of the cells are overloaded, the antenna system corresponding to the overloaded cell and a lightly loaded base transceiver station among the base transceiver stations corresponding to non-overloaded cells are connected.

7. The mobile communication network system according to claim 3, wherein
at least some of said plurality of antenna systems are directional variable antenna systems capable of adaptively changing their directivity, and wherein
said mobile communication network further comprises a switching control unit that controls said connection switching unit so that, when an overloaded spot arises at a certain location in a service area of the mobile communication network system, the directional variable antenna system whose directivity is so changed as to cover the spot and a lightly loaded radio base transceiver among said base transceiver stations are connected.

8. The mobile communication network system according to claim 3, wherein
said plurality of base transceiver stations comprise ordinary base transceiver stations corresponding to cells making up the mobile communication network system and anti-overloading base transceiver stations having no corresponding cells, wherein
said mobile communication network system further comprises a switching control unit that controls said connection switching unit so that the anti-overloading base transceiver station is connected to an antenna system covering a cell predicted to be overloaded.

9. A mobile communication network system in which communications are conducted inside closed spaces including a building or underground area, said mobile communication network system comprising:
a plurality of base transceiver stations;
a plurality of antenna systems; and
a connection switching unit that switches the connection between said plurality of base transceiver stations and said plurality of antenna systems; wherein
said connection switching unit that switches one of said antenna systems connected to one of said base transceiver stations with base transceiver stations which are in non-neighboring cells from the entirety of the network;
wherein:
a unit including a base station transceiver station is different than a unit including an antenna system, and wherein each of the plurality of antenna systems is located in a different location than each of the base transceiver stations;
a base transceiver station in a non-neighboring cell achieves a load distribution;
the radio-channel connection controller distributes said load by selecting at least a portion of said base transceiver station from non-neighboring cells from the entirety of the network and connecting it to the antenna system in the area of said load;
and wherein the base transceiver stations do not have antennas.

10. The mobile communication network system according to claim 9, wherein
said plurality of antenna systems and plurality of base transceiver stations respectively correspond to cells making up said mobile communication network, and wherein
said mobile communication network system further comprises a switching control unit that controls said connection switching unit so that, when some of the cells are overloaded, an antenna system corresponding to the overloaded cell and a lightly loaded base transceiver station among the base transceiver stations corresponding to non-overloaded cells are connected.

11. A mobile communication network system, comprising:
a plurality of the same constituent parts of a plurality of base transceiver stations;
a plurality of remaining constituent parts each connected to an antenna system and making up the rest of the base transceiver stations; and
a connection switching unit that switches the connection of said plurality of the same constituent parts and said plurality of the remaining constituent parts; wherein
said connection switching unit that switches one of said antenna systems connected to one of said base transceiver stations with base transceiver stations which are in non-neighboring cells from the entirety of the network;
wherein:
a unit including a base station transceiver station is different than a unit including an antenna system, and wherein each of the plurality of antenna systems is located in a different location than each of the base transceiver stations;
a base transceiver station in a non-neighboring cell achieves a load distribution;
the radio-channel connection controller distributes said load by selecting at least a portion of said base transceiver station from non-neighboring cells from the entirety of the network and connecting it to the antenna system in the area of said load;
and wherein the base transceiver stations do not have antennas.

12. The mobile communication network system according to claim 11, wherein
at least some of said remaining constituent parts connected with the antenna system are provided near a border between cells of said mobile communication network, and wherein said mobile communication network system further comprises a switching control unit that controls said connection switching unit so that, when the cell whose remaining constituent part is provided near the border is overloaded, a lightly loaded constituent part among said plurality of the same constituent parts and the remaining constituent part provided near the border are connected.

13. The mobile communication network system according to claim 11, wherein
at least some of said remaining constituent parts connected with the antenna system are so provided as to cover a spot predicted to be overloaded, and wherein
said mobile communication network system further comprises a switching control unit that controls said connection switching unit so that a lightly loaded same constituent part of the radio base transceiver among said plurality of the same constituent parts and the remaining constituent part so provided as to cover the spot are connected when the spot is overloaded.

14. The mobile communication network system according to claim 11, wherein
the plurality of antenna systems and plurality of base transceiver stations correspond to cells making up said mobile communication network, and wherein
said mobile communication network system further comprises a switching control unit that controls said connection switching unit so that, when some of the cells are overloaded, the remaining constituent part provided as a reserve in a base transceiver station corresponding to the overloaded cell and being connected with the antenna system and the constituent part corresponding to non-overloaded cell are connected.

15. A mobile communication network system in which communications are conducted in closed spaces including a building or underground area, said mobile communication network system comprising:
a plurality of the same constituent parts of a plurality of base transceiver stations;
a plurality of remaining constituent parts each connected to an antenna system and making up the rest of the base transceiver stations; and
a connection switching unit that controls the connection between said plurality of the same constituent parts and said plurality of remaining constituent parts; wherein
said connection switching unit that switches one of said antenna systems connected to one of said base transceiver stations with base transceiver stations which are in non-neighboring cells from the entirety of the network;
wherein:
a unit including a base station transceiver station is different than a unit including an antenna system, and wherein each of the plurality of antenna systems is located in a different location than each of the base transceiver stations;
a base transceiver station in a non-neighboring cell achieves a load distribution;
the radio-channel connection controller distributes said load by selecting at least a portion of said base transceiver station from non-neighboring cells from the entirety of the network and connecting it to the antenna system in the area of said load;
and wherein the base transceiver stations do not have antennas.

16. The mobile communication network system according to claim 15, wherein
the plurality of antenna systems and plurality of base transceiver stations respectively correspond to cells making up said mobile communication network, and wherein
said mobile communication network system further comprises a switching control unit that controls said connection switching unit so that, when some of the cells are overloaded, the remaining constituent part connected with an antenna system corresponding to the overloaded cell and the constituent part corresponding to the non-overloaded cell are connected.

17. A base station corresponding to a first base station in a mobile communication network including said first base station which forms a first communication area by using a first antenna, a second base station which forms a second communication area adjacent to said first communication area by using a second antenna, and a third base station which forms a third communication area not adjacent to said first communication area though adjacent to said second communication area by using a third antenna, said base station comprising:
a signal processor, when said first base station uses a fourth antenna that can transmit a radio signal to a wireless area which is a part of said second communication area and is not adjacent to said first communication area, configured to generate signals and provide each signal to the first antenna and the fourth antenna in parallel for parallel transmission of a radio signal from the first antenna and the fourth antenna forming not adjacent communication areas respectively.

* * * * *